(12) United States Patent
Tabata et al.

(10) Patent No.: US 11,440,548 B2
(45) Date of Patent: Sep. 13, 2022

(54) FOUR-WHEEL DRIVE VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Yuuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/325,365

(22) Filed: May 20, 2021

(65) Prior Publication Data

US 2021/0380111 A1 Dec. 9, 2021

(30) Foreign Application Priority Data

Jun. 8, 2020 (JP) .............................. JP2020-099685

(51) Int. Cl.
*B60W 30/18* (2012.01)
*B60K 17/356* (2006.01)
(Continued)

(52) U.S. Cl.
CPC ......... *B60W 30/18127* (2013.01); *B60K 1/04* (2013.01); *B60K 17/02* (2013.01);
(Continued)

(58) Field of Classification Search
CPC .... B60W 10/02; B60W 10/08; B60W 10/184; B60W 30/18127; B60W 2510/0275; B60W 2510/0291; B60W 2510/244; B60W 2520/105; B60W 2520/403; B60W 2540/12; B60W 2710/029; B60W 2710/08; B60W 2710/18; B60K 1/04; B60K 17/02;
(Continued)

(56) References Cited

U.S. PATENT DOCUMENTS

2005/0227810 A1* 10/2005 Nakagawa ............ B60W 10/02
477/172
2012/0190499 A1 7/2012 Oba
(Continued)

FOREIGN PATENT DOCUMENTS

WO WO 2011/042951 A1 4/2011

*Primary Examiner* — Edwin A Young
(74) *Attorney, Agent, or Firm* — Oblon, McClelland, Maier & Neustadt, L.L.P.

(57) ABSTRACT

A four-wheel drive vehicle includes: (a) main drive wheels and auxiliary drive wheels; (b) a rotating machine as a drive power source; (c) a drive-power distribution clutch configured to allocate a part of a drive power outputted to the main drive wheels from the drive power source, to the auxiliary drive wheels, so as to distribute the drive power to the main drive wheels and the auxiliary drive wheels with a drive-power distribution ratio between the auxiliary drive wheels and the main drive wheels, such that the drive-power distribution ratio is variable with an engaging force of the drive-power distribution clutch being controlled; and (d) a control apparatus configured, when determining that a heat load of the drive-power distribution clutch is large during deceleration running of the vehicle, to limit a regenerative torque of the rotating machine, as compared with when determining that the heat load is small.

11 Claims, 7 Drawing Sheets

(51) Int. Cl.
  *B60K 17/35* (2006.01)
  *B60L 7/18* (2006.01)
  *B60K 1/04* (2019.01)
  *B60L 15/20* (2006.01)
  *B60L 7/26* (2006.01)
  *B60W 10/08* (2006.01)
  *B60W 10/184* (2012.01)
  *B60W 10/02* (2006.01)
  *B60K 17/02* (2006.01)

(52) U.S. Cl.
  CPC ............ *B60K 17/35* (2013.01); *B60K 17/356* (2013.01); *B60L 7/18* (2013.01); *B60L 7/26* (2013.01); *B60L 15/20* (2013.01); *B60W 10/02* (2013.01); *B60W 10/08* (2013.01); *B60W 10/184* (2013.01); *B60W 2510/0275* (2013.01); *B60W 2510/0291* (2013.01); *B60W 2510/244* (2013.01); *B60W 2520/105* (2013.01); *B60W 2520/403* (2013.01); *B60W 2540/12* (2013.01); *B60W 2710/029* (2013.01); *B60W 2710/08* (2013.01); *B60W 2710/18* (2013.01)

(58) Field of Classification Search
  CPC ......... B60K 17/35; B60K 17/356; B60L 7/18; B60L 7/26; B60L 15/20
  See application file for complete search history.

(56) References Cited

U.S. PATENT DOCUMENTS

| | | | |
|---|---|---|---|
| 2014/0200111 A1* | 7/2014 | Murakami | B60W 10/10 180/65.265 |
| 2015/0274154 A1* | 10/2015 | Tsuda | B60W 20/14 903/945 |
| 2017/0015298 A1* | 1/2017 | Imamura | B60K 17/02 |

\* cited by examiner

PU:12、MG1、MG2

CB: C1、C2、B1、B2

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

FOUR-WHEEL DRIVE VEHICLE

This application claims priority from Japanese Patent Application No. 2020-099685 filed on Jun. 8, 2020, the disclosure of which is herein incorporated by reference in its entirety.

FIELD OF THE INVENTION

The present invention relates to a four-wheel drive vehicle including a drive-power distribution clutch configured to transmit a drive power of a drive power source to main and auxiliary drive wheels, at a drive-power distribution ratio between the auxiliary drive wheels and the main drive wheels, wherein the drive-power distribution ratio is variable with an engaging force of the drive-power distribution clutch being controlled. More particularly, the present invention relates to techniques of suppressing reduction of durability of the drive-power distribution clutch, wherein the durability reduction could be caused due to deceleration running of the vehicle.

BACKGROUND OF THE INVENTION

There is well-known a four-wheel drive vehicle including: (a) main drive wheels and auxiliary drive wheels; (b) a rotating machine as a drive power source; (c) a drive-power distribution clutch configured to allocate a part of a drive power outputted to the main drive wheels from the drive power source, to the auxiliary drive wheels, so as to distribute the drive power to the main drive wheels and the auxiliary drive wheels with a drive-power distribution ratio that is a ratio of distribution of the drive power between the auxiliary drive wheels and the main drive wheels, such that the drive-power distribution ratio is variable with an engaging force of the drive-power distribution clutch being controlled. A four-wheel drive vehicle is disclosed in WO/2011/042951 is an example of such a vehicle. It is noted that the four-wheel drive vehicle disclosed in this International Patent Application Publication uses a regenerative brake by operation of the rotating machine during deceleration running of the vehicle.

SUMMARY OF THE INVENTION

By the way, for example, in a four-wheel drive vehicle including only an engine as the drive power source, unlike the above-described four-wheel drive vehicle disclosed in the above-identified International Patent Application Publication, an engine brake is used during deceleration running of the vehicle. However, in the above-described four-wheel drive vehicle disclosed in the above-identified International Patent Application Publication, the regenerative brake as well as the engine brake is used during deceleration running of the vehicle, and a braking force based on the regenerative brake is larger than a baking force based on the engine brake. Therefore, there is a risk of reduction of durability of the drive-power distribution clutch due to more increase of a heat load of the drive-power distribution clutch, for example, as compared with in the four-wheel drive vehicle including only the engine as the drive power source.

The present invention was made in view of the background art described above. It is therefore an object of the present invention to provide a four-wheel drive vehicle capable of suppressing reduction of durability of a drive-power distribution clutch.

The object indicated above is achieved according to the following aspects of the present invention.

According to a first aspect of the invention, there is provided a four-wheel drive vehicle comprising: (a) main drive wheels and auxiliary drive wheels; (b) a rotating machine as a drive power source; (c) a drive-power distribution clutch configured to allocate a part of a drive power outputted to the main drive wheels from the drive power source, to the auxiliary drive wheels, so as to distribute the drive power to the main drive wheels and the auxiliary drive wheels with a drive-power distribution ratio that is a ratio of distribution of the drive power between the auxiliary drive wheels and the main drive wheels, such that the drive-power distribution ratio is variable with an engaging force of the drive-power distribution clutch being controlled; and (d) a control apparatus configured, during deceleration running of the vehicle, to determine whether a heat load of the drive-power distribution clutch is large or not, and to limit a regenerative torque of the rotating machine when determining that the heat load is large, as compared with when determining that the heat load is small.

According to a second aspect of the invention, in the four-wheel drive vehicle according to the first aspect of the invention, each of the main and auxiliary drive wheels is provided with a wheel brake that is configured to apply a braking force to the each of the main and auxiliary drive wheels, wherein the control apparatus is configured, when limiting the regenerative torque of the rotating machine, to control the braking force applied by the wheel brake to each of the main and auxiliary drive wheels, so as to compensate a shortage of a total braking force acting on the vehicle, the shortage being due to limitation of the regenerative torque of the rotating machine.

According to a third aspect of the invention, in the four-wheel drive vehicle according to the second aspect of the invention, the control apparatus is configured, when compensating the shortage of the total braking force acting on the vehicle, to control the braking force applied by the wheel brake to each of the main and auxiliary drive wheels, such that a ratio between a part of the total braking force applied to each of the main drive wheels and a part of the total braking force applied to each of the auxiliary drive wheels becomes substantially equal to the drive-power distribution ratio.

According to a fourth aspect of the invention, in the four-wheel drive vehicle according to any one of the first through third aspects of the invention, there is further provided an electric storage device to and from which an electric power is to be supplied from and to the rotating machine, wherein the control apparatus is configured, when the heat load of the drive-power distribution clutch is to be reduced upon determination that the heat load is large during the deceleration running of the vehicle, to limit the regenerative torque of the rotating machine in a case in which a state of charge that is an amount of the electric power remaining in the electric storage device is not smaller than a predetermined value, and to change the drive-power distribution ratio such that the heat load of the drive-power distribution clutch is reduced in a case in which the state of charge is smaller than the predetermined value.

According to a fifth aspect of the invention, in the four-wheel drive vehicle according to any one of the first through fourth aspects of the invention, the control apparatus is configured to determine whether the heat load of the drive-power distribution clutch is large or not, based on an amount of an input torque inputted to the drive-power distribution clutch.

According to a sixth aspect of the invention, in the four-wheel drive vehicle according to the first through fourth aspects of the invention, the drive-power distribution clutch is a wet clutch, wherein the control apparatus is configured to determine whether the heat load of the drive-power distribution clutch is large or not, based on a temperature of a fluid or oil in the drive-power distribution clutch.

According to a seventh aspect of the invention, in the four-wheel drive vehicle according to any one of the first through sixth aspects of the invention, the control apparatus is configured, during the deceleration running of the vehicle, to determine that the heat load of the drive-power distribution clutch is large when the heat load of the drive-power distribution clutch is larger than a predetermined threshold value, and to determine that the heat load of the drive-power distribution clutch is small when the heat load of the drive-power distribution clutch is not larger than the threshold value. For example, the control apparatus is configured, when the heat load of the drive-power distribution clutch is larger than the threshold value, to reduce the regenerative torque of the rotating machine at a reduction ratio, wherein the reduction ratio is a constant value that is constant irrespective of a difference between the heat load of the front-wheel drive clutch and the threshold value, or a variable value that is increased with increase of a difference between the heat load of the front-wheel drive clutch and the threshold value.

According to an eighth aspect of the invention, in the four-wheel drive vehicle according to the seventh aspect of the invention, the control apparatus is configured, when the heat load of the drive-power distribution clutch has become larger than the threshold value, to limit the regenerative torque of the rotating machine, and to set a limitation-cancellation value that is smaller than the threshold value, wherein the control apparatus is configured, when the heat load of the drive-power distribution clutch has become not larger than the limitation-cancellation value, to cancel limitation of the regenerative torque of the rotating machine.

According to a ninth aspect of the invention, in the four-wheel drive vehicle according to the seventh or eighth aspect of the invention, there is further provided a deceleration adjustment device that is to be manually operated by a driver of the vehicle during the deceleration running of the vehicle, so as to adjust a degree of deceleration of the vehicle, wherein the control apparatus is configured, when the deceleration adjustment device is manually operated by the driver of the vehicle, to change the threshold value such that the threshold value is increased.

In the four-wheel drive vehicle according to the first aspect of the invention, the control apparatus is configured, during the deceleration running of the vehicle, to determine whether the heat load of the drive-power distribution clutch is large or not, and to limit the regenerative torque of the rotating machine when determining that the heat load is large, as compared with when determining that the heat load is small. Thus, the regenerative torque of the rotating machine is limited by the control apparatus when it is determined that the heat load of the drive-power distribution clutch is large during the deceleration running of the vehicle. Owing to this arrangement, the heat load of the drive-power distribution clutch can be reduced without the drive-power distribution ratio being changed, so that it is possible to suppress reduction of durability of the drive-power distribution clutch.

In the four-wheel drive vehicle according to the second aspect of the invention, each of the main and auxiliary drive wheels is provided with the wheel brake that is configured to apply the braking force to the each of the main and auxiliary drive wheels, wherein the control apparatus is configured, when limiting the regenerative torque of the rotating machine, to control the braking force applied by the wheel brake to each of the main and auxiliary drive wheels, so as to compensate a shortage of the total braking force acting on the vehicle, which shortage is due to the limitation of the regenerative torque of the rotating machine. Owing to this arrangement, when the regenerative torque of the rotating machine is limited, the control apparatus controls the braking force applied by the wheel brake to each of the main and auxiliary drive wheels, such that the shortage of the total braking force acting on the vehicle, which shortage is due to the limitation of the regenerative torque of the rotating machine, is compensated whereby the shortage of the total braking force acting on the vehicle can be suppressed.

In the four-wheel drive vehicle according to the third aspect of the invention, the control apparatus is configured, when compensating the shortage of the total braking force acting on the vehicle, to control the braking force applied by the wheel brake to each of the main and auxiliary drive wheels, such that the ratio between a part of the total braking force applied to each of the main drive wheels and a part of the total braking force applied to each of the auxiliary drive wheels becomes substantially equal to the drive-power distribution ratio. Thus, the ratio between the part of the total braking force applied to each of the main drive wheels and the part of the total braking force applied to each of the auxiliary drive wheels becomes substantially equal to the drive-power distribution ratio. Owing to this arrangement, it is possible to appropriately suppress change of attitude of the vehicle.

In the four-wheel drive vehicle according to the fourth aspect of the invention, the control apparatus further has a function of changing the drive-power distribution ratio such that the heat load of the drive-power distribution clutch is reduced, when determining that the heat load is large during the deceleration running of the vehicle, wherein the control apparatus is configured, when the heat load of the drive-power distribution clutch is to be reduced upon determination that the heat load is large during the deceleration running of the vehicle, to limit the regenerative torque of the rotating machine in a case in which a state of charge that is an amount of the electric power remaining in the electric storage device is not smaller than a predetermined value, and to change the drive-power distribution ratio such that the heat load of the drive-power distribution clutch is reduced in a case in which the state of charge is smaller than the predetermined value. Thus, when it is determined that the heat load of the drive-power distribution clutch in the case in which the state of charge is smaller than the predetermined value, the heat load of the drive-power distribution clutch is reduced by changing the drive-power distribution ratio in a manner that reduces the heat load of the drive-power distribution clutch without limiting the regenerative torque of the rotating machine. Owing to this arrangement, it is possible to appropriately suppress reduction of an energy efficiency.

In the four-wheel drive vehicle according to the fifth aspect of the invention, the control apparatus is configured to determine whether the heat load of the drive-power distribution clutch is large or not, based on the amount of the input torque inputted to the drive-power distribution clutch. Thus, during the deceleration running of the vehicle, the control apparatus can limit the regenerative torque of the rotating machine, depending on the amount of the input torque inputted to the drive-power distribution clutch.

In the four-wheel drive vehicle according to the sixth aspect of the invention, the drive-power distribution clutch is a wet clutch, wherein the control apparatus is configured to determine whether the heat load of the drive-power distribution clutch is large or not, based on the temperature of the fluid in the drive-power distribution clutch. Thus, during the deceleration running of the vehicle, the control apparatus can limit the regenerative torque of the rotating machine, depending on the amount of the input torque inputted to the drive-power distribution clutch. Thus, during the deceleration running of the vehicle, the control apparatus can limit the regenerative torque of the rotating machine, depending on the temperature of the fluid in the drive-power distribution clutch.

In the four-wheel drive vehicle according to the seventh aspect of the invention, the control apparatus is configured, during the deceleration running of the vehicle, to determine that the heat load of the drive-power distribution clutch is large when the heat load of the drive-power distribution clutch is larger than the predetermined threshold value, and to determine that the heat load of the drive-power distribution clutch is small when the heat load of the drive-power distribution clutch is not larger than the threshold value. Thus, during the deceleration running of the vehicle, the control apparatus can limit the regenerative torque of the rotating machine, when the heat load of the drive-power distribution clutch is larger than the threshold value.

In the four-wheel drive vehicle according to the eighth aspect of the invention, the control apparatus is configured, when the heat load of the drive-power distribution clutch has become larger than the threshold value, to limit the regenerative torque of the rotating machine, and to set the limitation-cancellation value that is smaller than the threshold value, and the control apparatus is configured, when the heat load of the drive-power distribution clutch has become not larger than the limitation-cancellation value, to cancel the limitation of the regenerative torque of the rotating machine. Owing to this arrangement, it is possible to appropriately reduce the heat load of the drive-power distribution clutch, because the control apparatus can limit the regenerative torque of the rotating machine for a relatively large length of time from a point of time at which the heat load of the drive-power distribution clutch becomes larger than the threshold value until a point of time at which the heat load of the drive-power distribution clutch becomes not larger than the limitation-cancellation value that is smaller than the threshold value.

In the four-wheel drive vehicle according to the ninth aspect of the invention, there is further provided a deceleration adjustment device that is to be manually operated by a driver of the vehicle during the deceleration running of the vehicle, so as to adjust a degree of deceleration of the vehicle, wherein the control apparatus is configured, when the deceleration adjustment device is manually operated by the driver of the vehicle, to change the threshold value such that the threshold value is increased. Thus, during the deceleration running of the vehicle, the threshold value is increased by manual operation of the deceleration adjustment device by the vehicle driver, so that the limitation of the regenerative torque of the rotating machine is alleviated whereby a drivability or operability of the vehicle is increased.

DETAILED DESCRIPTION OF PREFERRED EMBODIMENT

Hereinafter, preferred embodiment of the invention will be described in detail with reference to the accompanying drawings.

Embodiment

Figure 1:
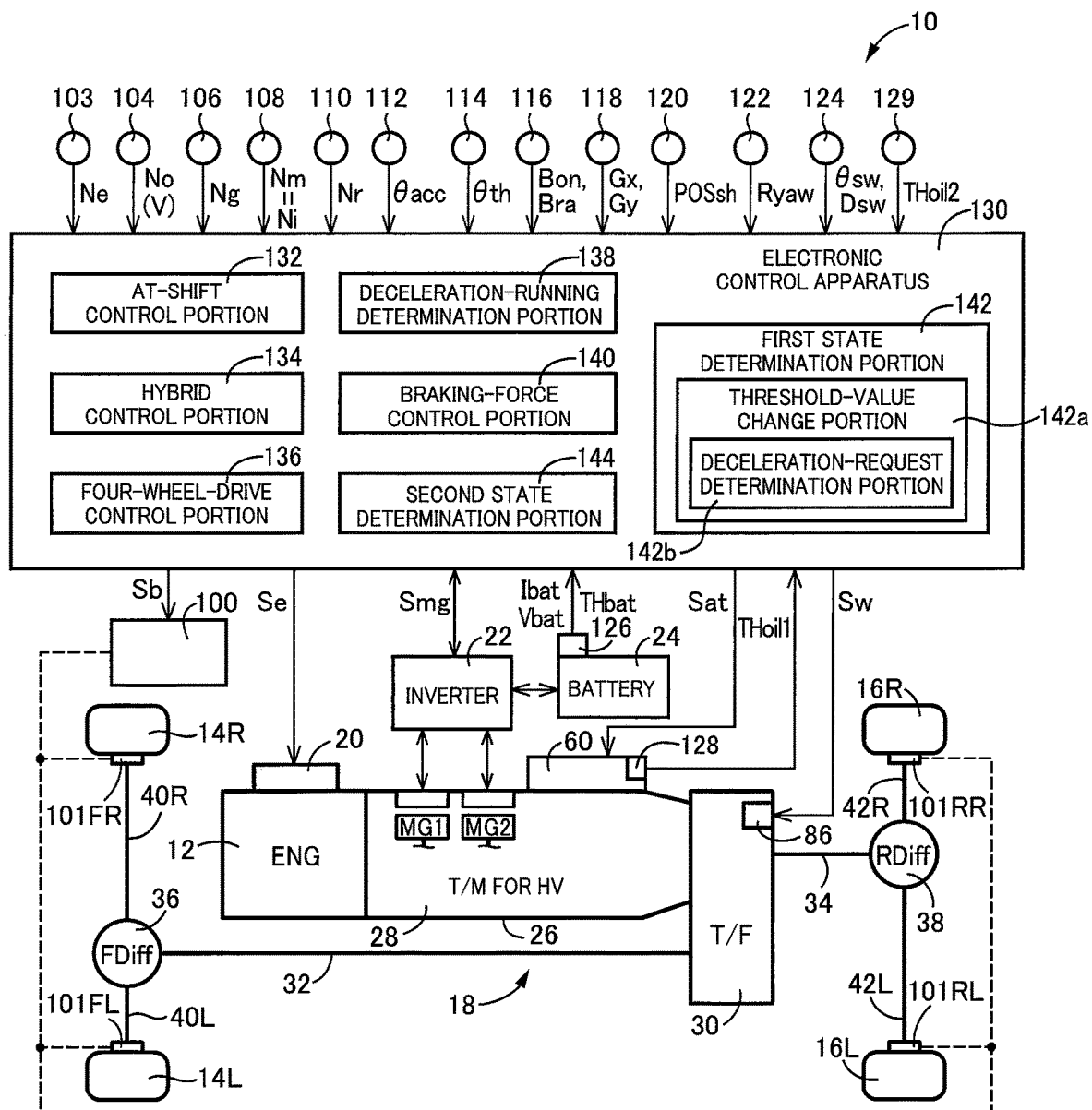
FIG. 1 is a view schematically showing a construction of a four-wheel drive vehicle to which the present invention is applied, for explaining major portions of control functions and control systems that are provided to perform various control operations in the four-wheel drive vehicle.

FIG. 1 is a view schematically showing a construction of a four-wheel drive vehicle 10 to which the present invention is applied, for explaining major portions of control functions and control systems that are provided to perform various control operations in the vehicle 10. As shown in FIG. 1, the vehicle 10 is a hybrid vehicle including drive power sources in the form of an engine 12 (see "ENG" in FIG. 1), a first rotating machine MG1 and a second rotating machine MG2. The vehicle 10 further includes right and left front wheels 14R, 14L, right and left rear wheels 16R, 16L and a power transmission apparatus 18 that is configured to transmit a drive power of the drive power sources such as the engine 12, to the right and left front wheels 14R, 14L and the right and left rear wheels 16R, 16L. The rear wheels 16R, 16L are main drive wheels that serve as drive wheels during a four-wheel drive running of the vehicle 10 but also during a two-wheel drive running of the vehicle 10. The front wheels 14R, 14L are auxiliary drive wheels that serve as driven wheels during the two-wheel drive running and serve as the drive wheel during the four-wheel drive running. The vehicle 10 is a four-wheel drive vehicle based on a vehicle of FR (front engine and rear drive) system. In the following description, the front wheels 14R, 14L will be referred to as "front wheels 14" and the rear wheels 16R, 16L will be referred to as "rear wheels 16", unless they are to be distinguished from each other. Further, the engine 12, first rotating machine MG1 and second rotating machine MG2 will be referred to as "drive power source PU", unless they are to be distinguished from one another.

The engine 12 is one of the drive power sources for driving the four-wheel drive vehicle 10 to run, and is a known internal combustion engine such as gasoline engine and diesel engine. The vehicle 10 is provided with an engine control device 20 that includes a throttle actuator, a fuel injection device and an ignition device. With the engine control device 20 being controlled by an electronic control apparatus 130 that is described below, an engine torque Te, which is an output torque of the engine 12, is controlled.

Each of the first and second rotating machines MG1, MG2 is a rotating electric machine having a function serving as an electric motor and a function serving as a generator. That is, each of the first and second rotating machines MG1, MG2 is a so-called "motor generator". Each of the first and second rotating machines MG1, MG2 is a rotating machine that can serve as the drive power source for driving the four-wheel drive vehicle 10 to run. The first and second rotating machines MG1, MG2 are connected to a battery 24 provided in the vehicle 10, through an inverter 22 provided in the vehicle 10. The inverter 22 is controlled by the electronic control apparatus 130 whereby an MG1 torque Tg and an MG2 torque Tm as output torques of the respective first and second rotating machines MG1, MG2 are controlled. The output torque of each of the first and second rotating machines MG1, MG2 serves as a power running torque when acting as a positive torque for acceleration of the vehicle 10, with the each of the first and second rotating machines MG1, MG2 being rotated in a forward direction. The output torque of each of the first and second rotating machines MG1, MG2 serves as a regenerative torque when acting as a negative torque for deceleration of the vehicle 10, with the each of the first and second rotating machines MG1, MG2 being rotated in the forward direction. The battery 24 is the electric storage device to and from which an electric power is supplied from and to the first rotating machine MG1 and the second rotating machine MG2. The output torque of each of the first and second rotating machines MG1, MG2 serves as a power running torque when acting as a positive torque for acceleration of the vehicle 10, with the each of the first and second rotating machines MG1, MG2 being rotated in a forward direction. The output torque of each of the first and second rotating machines MG1, MG2 serves as a regenerative torque when acting as a negative torque for deceleration of the vehicle 10, with the each of the first and second rotating machines MG1, MG2 being rotated in the forward direction. The battery 24 is an electric storage device to and from which an electric power is supplied from and to the first rotating machine MG1 and the second rotating machine MG2. The first and second rotating machines MG1, MG2 are disposed inside a casing 26 as a non-rotary member that is attached to a body of the vehicle 10.

The power transmission apparatus 18 includes an automatic transmission 28 (see "T/M FOR HV" in FIG. 1) that is a transmission for hybrid system, a transfer 30 (see "T/F" in FIG. 1), a front propeller shaft 32, a rear propeller shaft 34, a front-wheel-side differential gear device 36 (see "FDiff" in FIG. 1), a rear-wheel-side differential gear device 38 (see "RDiff" in FIG. 1), right and left front axles 40R, 40L and right and left rear axles 42R, 42L, so that the drive power of the engine 12, example, is to be transmitted to the rear wheels 16R, 16L sequentially through the transfer 30, rear propeller shaft 34, rear-wheel-side differential gear device 38 and right and left rear axles 42R, 42L, for example. When a part of the drive power transmitted to the transfer 30 from the engine 12 is distributed toward the front wheels 14R, 14L in the power transmission apparatus 18, the distributed part of the drive power is transmitted to the front wheels 14R, 14L sequentially through the front propeller shaft 32, front-wheel-side differential gear device 36 and right and left front axles 40R, 40L, for example.

Figures 2, 3:
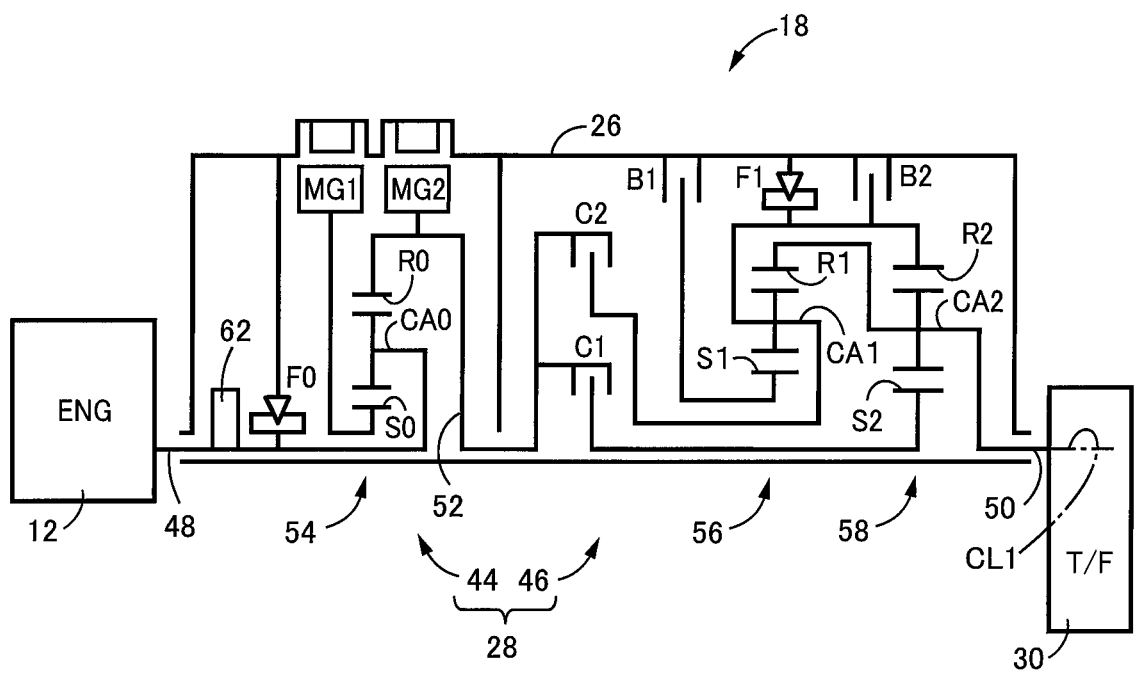
FIG. 2 is a view schematically showing a construction of an automatic transmission shown in FIG. 1.
FIG. 3 is a table indicating a relationship between each gear position of a mechanically-operated step-variable transmission portion (shown in FIG. 2) and a combination of engagement devices of the step-variable transmission portion, which are placed in engaged states to establish the gear position in the step-variable transmission portion.

FIG. 2 is a view schematically showing a construction of the automatic transmission 28. As shown in FIG. 2, the automatic transmission 28 includes an electrically-operated continuously-variable transmission portion 44 and a mechanically-operated step-variable transmission portion 46 that are disposed in series on a rotary axis CL1 that are common to the transmission portions 44, 46 within the casing 26. The electrically-operated continuously-variable transmission portion 44 is connected to the engine 12 directly or indirectly through, for example, a damper (not shown). The mechanically-operated step-variable transmission portion 46 is connected to an output rotary member of the electrically-operated continuously-variable transmission portion 44. The transfer 30 is connected to an output rotary member of the mechanically-operated step-variable transmission portion 46. In the automatic transmission 28, the drive power outputted from the engine 12 or the second rotating machine MG2, for example, is transmitted to the mechanically-operated step-variable transmission portion 46, and is then transmitted from the mechanically-operated step-variable transmission portion 46 to the transfer 30. In the following description, the electrically-operated continuously-variable transmission portion 44 and the mechanically-operated step-variable transmission portion 46 will be referred simply to as "continuously-variable transmission portion 44" and "step-variable transmission portion 46", respectively. The power corresponds to a torque and a force unless they are to be distinguished from one another. Each of the continuously-variable transmission portion 44 and the step-variable transmission portion 46 is constructed substantially symmetrically about the rotary axis CL1, so that a lower half of each of the transmission portions 44, 46 is not shown in FIG. 2. The rotary axis CL1 corresponds to an axis of a crank shaft of the engine 12, an axis of a connection shaft 48 which is an input rotary member of the automatic transmission 28 and which is connected to the crank shaft of the engine 12, and an axis of an output shaft 50 which is an output rotary member of the automatic transmission 28. The connection shaft 48 serves also as an input rotary member of the continuously-variable transmission portion 44. The output shaft 50 serves also as an output rotary member of the step-variable transmission portion 46.

The continuously-variable transmission portion 44 is provided with: the above-described first rotating machine MG1; and a differential mechanism 54 serving as a drive-power distribution mechanism to mechanically distribute the power of the engine 12 to the first rotating machine MG1 and to an intermediate transmission member 52 that is an output rotary member of the continuously-variable transmission portion 44. The above-described second rotating machine is MG2 connected to the intermediate transmission member 52 in a power transmittable manner. The continuously-variable transmission portion 44 is an electrically-operated continuously-variable transmission wherein a differential state of the differential mechanism 54 is controllable by controlling an operation state of the first rotating machine MG1. The continuously-variable transmission portion 44 is operated as the electrically-operated continuously-variable transmission whose gear ratio (may be referred also to as "speed ratio") γ0 (=engine rotational speed Ne/MG2 rotational speed Nm) is to be changed. The engine rotational speed Ne is a rotational speed of the engine 12, and is equal to an input rotational speed of the continuously-variable transmission portion 44, i.e., a rotational speed of the connection shaft 48. The engine rotational speed Ne is also an input rotational speed of the automatic transmission 28 that is constituted mainly by the continuously-variable transmission portion 44 and the step-variable transmission portion 46. The MG2 rotational speed Nm is a rotational speed of the second rotating machine MG, and is equal to an output rotational speed of the continuously-variable transmission portion 44, i.e., a rotational speed of the intermediate transmission member 52. The first rotating machine MG1 is a rotating machine capable of controlling the engine rotational speed Ne. It is noted that controlling an operation state of the first rotating machine MG1 is controlling the operation of the first rotating machine MG1.

The differential mechanism 54 is a planetary gear device of a single-pinion type having a sun gear S0, a carrier CA0 and a ring gear R0. The carrier CA0 is connected to the engine 12 through the connection shaft 48 in a drive-power transmittable manner, and the sun gear S0 is connected to the first rotating machine MG1 in a drive-power transmittable manner, and the ring gear R0 is connected to the second rotating machine MG2 in a drive-power transmittable manner. In the differential mechanism 54, the carrier CA0 serves as an input element, the sun gear S0 serves as a reaction element, and the ring gear R0 serves as an output element.

The step-variable transmission portion 46 is a step-variable transmission that constitutes a power transmission path between the intermediate transmission member 52 and the transfer 30. The intermediate transmission member 52 also serves as an input rotary member of the step-variable transmission portion 46. The second rotating machine MG2 is connected to the intermediate transmission member 52, so as to be rotated integrally with the intermediate transmission member 52. The step-variable transmission portion 46 is an automatic transmission that constitutes a part of a power transmission path between the drive power source PU (for driving the vehicle 10 to run) and the drive wheels (front and rear wheels 14, 16). The step-variable transmission portion 46 is a known automatic transmission of a planetary gear type provided with a plurality of planetary gear devices including first and second planetary gear devices 56, 58 and a plurality of engagement devices including a one-way clutch F1, a clutch C1, a clutch C2, a brake B1 and a brake B2. Hereinafter, the clutch C1, clutch C2, brake B1 and brake B2 will be referred to as "engagement devices CB" unless they are to be distinguished from one another.

Each of the engagement devices CB is a hydraulically-operated frictional engagement device constituted by, for example, a wet-type multiple-disc clutch including a plurality of friction plates which are superposed on each other and which are forced against each other by a hydraulic actuator, or a band brake including a rotary drum and one band or two bands which is/are wound on an outer circumferential surface of the rotary drum and tightened a hydraulic actuator. Each of the engagement devices CB receives a regulated hydraulic pressure supplied from a hydraulic control unit (hydraulic control circuit) 60 (see FIG. 1) that is provided in the vehicle 10, whereby its operation state is switched between an engaged state and a released state, for example.

In the step-variable transmission portion 46, selected ones of rotary elements of the first and second planetary gear devices 56, 58 are connected to each other or to the intermediate transmitting member 52, casing 26 or output shaft 50, either directly or indirectly through the engagement devices CB or the one-way clutch F1. The rotary elements of the first planetary gear device 56 are a sun gear S1, a carrier CA1 and a ring gear R1. The rotary elements of the second planetary gear device 58 are a sun gear S2, a carrier CA2 and a ring gear R2.

The step-variable transmission portion 46 is shifted to a selected one of a plurality of gear positions (speed positions) by engaging actions of selected ones of the engagement devices CB. The plurality of AT gear positions have respective different gear ratios (speed ratios) γat (=AT input rotational speed Ni/output rotational speed No). Namely, the step-variable transmission portion 46 is shifted up and down from one gear position to another by placing selected ones of the engagement devices in the engaged state. The step-variable transmission portion 46 is a step-variable automatic transmission configured to establish a selected one of the plurality of gear positions. In the following description of the present embodiment, the gear position established in the step-variable transmission portion 46 will be referred to as AT gear position. The AT input rotational speed Ni is an input rotational speed of the step-variable transmission portion 46 that is a rotational speed of the input rotary member of the step-variable transmission portion 46, which is equal to a rotational speed of the intermediate transmission member 52, and which is equal to the MG2 rotational speed Nm. Thus, the AT input rotational speed Ni can be represented by the MG2 rotational speed Nm. The output rotational speed No is a rotational speed of the output shaft 50 that is an output rotational speed of the step-variable transmission portion 46, which is considered to be an output rotational speed of the automatic transmission 28.

As shown in a table of FIG. 3, the step-variable transmission portion 46 is configured to establish a selected one of a plurality of AT gear positions in the form of four forward AT gear positions and a reverse AT gear position. The four forward AT gear positions consist of a first speed AT gear position, a second speed AT gear position, a third speed AT gear position and a fourth speed AT gear position, which are represented by "1st", "2nd", "3rd" and "4th" in the table of FIG. 3. The first speed AT gear position is the lowest-speed gear position having a highest gear ratio γat, while the fourth speed AT gear position is the highest-speed gear position having a lowest gear ratio γat. The reverse AT gear position is represented by "Rev" in the table of FIG. 3, and is established by, for example, engagements of the clutch C1 and the brake B2. That is, when the vehicle 10 is to run in reverse direction, the first speed AT gear position is established, for example. The table of FIG. 3 indicates a relationship between each of the AT gear positions of the step-variable transmission portion 46 and operation states of the respective engagement devices CB of the step-variable transmission portion 46, namely, a relationship between each of the AT gear positions and a combination of ones of the engagement devices CB, which are to be placed in theirs engaged states to establish the each of the AT gear positions. In the table of FIG. 3, "O" indicates the engaged state of the engagement devices CB, "Δ" indicates the engaged state of the brake B2 during application of an engine brake to the vehicle 10 or during a coasting shift-down action of the step-variable transmission portion 46, and the blank indicates the released state of the engagement devices CB.

The step-variable transmission portion 46 is configured to switch from one of the AT gear positions to another one of the AT gear positions, namely, to establish one of the AT gear positions which is selected, by the electronic control apparatus 130, according to, for example, an acceleration operation made by a vehicle driver (operator) and the vehicle running speed V. The step-variable transmission portion 46 is shifted up or down from one of the AT gear positions to another, for example, by so-called "clutch-to-clutch" shifting operation that is made by releasing and engaging actions of selected two of the engagement devices CB, namely, by a releasing action of one of the engagement devices CB and an engaging action of another one of the engagement devices CB.

The four-wheel drive vehicle 10 further includes an MOP 62 that is a mechanically-operated oil pump, and an electrically-operated oil pump (not shown).

The above-described one-way clutch F0 is a locking mechanism by which the carrier CA0 can be fixed to be unrotatable. That is, the one-way clutch F0 is the lock mechanism capable of fixing the connection shaft 48 (which is connected to the crank shaft of the engine 12 and is to be rotated integrally with the carrier CA0) relative to the casing 26. The one-way clutch F0 includes two members that are rotatable relative to each other, wherein one of the two members is connected integrally to the connection shaft 48, and the other member is connected integrally to the casing 26. The other member of the one-way clutch F0 is to be rotated in a positive direction (that corresponds to a direction of rotation of the engine 12 during operation of the engine 12), with the one-way clutch F0 being in its released state. However, the other member of the one-way clutch F0 is not rotatable in a negative direction (that is opposite to the above-describe positive direction), with the one-way clutch F0 being automatically placed in its engaged. Thus, the engine 12 is rotatable relative to the casing 26 when the one-way clutch F0 is in the released state, and is unrotatable relative to the casing 26 when the one-way clutch F0 is the engaged state. That is, the engine 12 is fixed to the casing 26 by the engagement of the one-way clutch F0. Thus, the one-way clutch F0 allows the carrier CA0 to be rotated in the above-described positive direction corresponding to the direction of rotation of the engine 12, and inhibits the carrier CA0 from being rotated in the above-described negative direction. That is, the one-way clutch F0 is the locking mechanism which allows rotation of the engine 12 in the positive direction and which inhibits rotation of the engine 12 in the negative direction.

The MOP 62 is connected to the connection shaft 48 so as to be rotated together with rotation the engine 12 and to discharge a working fluid OIL that is be used in the power transmission apparatus 18. Further, the electrically-operated oil pump (not shown) is operated, for example, when the engine 12 is stopped, namely, when the MOP 62 is not operated. The working fluid OIL discharged from the MOP 62 and the electrically-operated oil pump is supplied to the hydraulic control unit 60. The working fluid OIL is regulated by the hydraulic control unit 60, and the regulated hydraulic pressure is supplied to each of the engagement devices CB of the power transmission apparatus 18, whereby the operation state of each of the engagement devices CB is switched.

Figure 4:
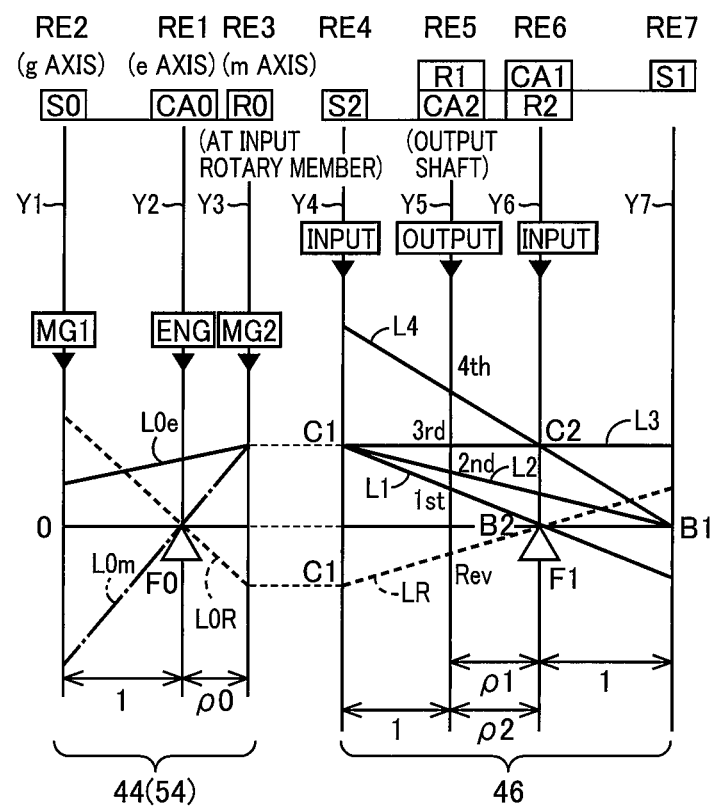
FIG. 4 is a collinear chart indicating a relationship among rotational speeds of rotary elements of an electrically-operated continuously-variable transmission portion (shown in FIG. 2) and the mechanically-operated step-variable transmission portion.

FIG. 4 is a collinear chart indicating a relationship among rotational speeds of the rotary elements of the continuously-variable transmission portion 44 and the step-variable transmission portion 46. In FIG. 4, three vertical lines Y1, Y2, Y3 corresponding to the three rotary elements of the differential mechanism 54 constituting the continuously variable transmission portion 44 are a g-axis representing the rotational speed of the sun gear S0 corresponding to a second rotary element RE2, an e-axis representing the rotational speed of the carrier CA0 corresponding to a first rotary element RE1, and an m-axis representing the rotational speed of the ring gear R0 corresponding to a third rotary element RE3 (i.e., the input rotational speed of the step-variable transmission portion 46) in order from the left side to the right. Four vertical lines Y4, Y5, Y6, Y7 of the step-variable transmission portion 46 are axes representing a rotational speed of the sun gear S2 corresponding to a fourth rotary element RE4, a rotational speed of the ring gear R1 and the carrier CA2 connected to each other and corresponding to a fifth rotary element RE5 (i.e., the rotational speed of the output shaft 50), a rotational speed of the carrier CA1 and the ring gear R2 connected to each other and corresponding to a sixth rotary element RE6, and a rotational speed of the sun gear S1 corresponding to a seventh rotary element RE7, respectively, in order from the left side to the right. An interval between the vertical lines Y1, Y2, Y3 is determined in accordance with a gear ratio ρ0 of the differential mechanism 54. An interval between the vertical lines Y4, Y5, Y6, Y7 is determined in accordance with gear ratios ρ1, ρ2 of the first and second planetary gear devices 56, 58. Where an interval between the sun gear and the carrier is set to an interval corresponding to "1" in the relationship between the vertical axes of the collinear chart, an interval between the carrier and the ring gear is set to an interval corresponding to the gear ratio ρ (=number of teeth of the sun gear/number of teeth of the ring gear) of the planetary gear device.

As shown in the collinear chart of FIG. 4, in the differential mechanism 54 of the continuously-variable transmission portion 44, the engine 12 (see "ENG" in FIG. 4) is connected to the first rotary element RE1, the first rotating machine MG1 (see "MG1" in FIG. 4) is connected to the second rotary element RE2, and the second rotating machine MG2 (see "MG2" in FIG. 4) is connected to the third rotary element RE3 that is to be rotated integrally with the intermediate transmission member 52, such that rotation of the engine 12 is to be transmitted to the step-variable transmission portion 46 through the intermediate transmission member 52. The relationship between the rational speeds of the sun gear S0 and the ring gear R0 in the continuously-variable transmission portion 44 is represented by straight lines L0e, L0m, L0R that pass through the vertical line Y2.

In the step-variable transmission portion 46, the fourth rotary element RE4 is selectively connected to the intermediate transmission member 52 through the clutch C1, the fifth rotary element RE5 is connected to the output shaft 50, the sixth rotary element RE6 is selectively connected to the intermediate transmission member 52 through the clutch C2 and is selectively connected to the casing 26 through the brake B2, and the seventh rotary element RE7 is selectively connected to the casing 26 through the brake B1. In the step-variable transmission portion 46, the gear positions "1st", "2nd", "3rd", "4th", "Rev" are selectively established by engagement/release controls of the engagement devices CB, and the rotational speed of the output shaft 50 when each of the gear positions is established is indicated by an intersection of a corresponding one of straight lines L1, L2, L3, L4, LR with the vertical line Y5.

In FIG. 4, a straight line L0e and the straight lines L1, L2, L3, L4, which are represented by respective solid lines, indicate the relationship among the rotational speeds of the rotary elements in forward running of the vehicle 10 in HV running mode in which the vehicle 10 is enabled to perform hybrid running (=HV running) with at least the engine 12 being operated as the drive power source. In this hybrid running mode, when a reaction torque, i.e., a negative torque from the first rotating machine MG1, is inputted in positive rotation to the sun gear S0 with respect to the engine torque Te inputted to the carrier CA0 in the differential mechanism 54, an engine direct transmission torque Td [=Te/(1+ρ0)=−(1/ρ0)×Tg] appears in the ring gear R0 as a positive torque in positive rotation. A combined torque of the engine direct transmission torque Td and the MG2 torque Tm is transmitted as a drive torque of the vehicle 10 acting in the forward direction depending on a required drive power to the transfer 30 through the step-variable transmission portion 46 in which one of the AT first to fourth gear positions is established. The first rotating machine MG1 functions as the generator when generating a negative torque with its rotation in positive direction. An electric power Wg generated by the first rotating machine MG1 is stored in the battery 24 or consumed by the second rotating machine MG2. The second rotating machine MG2 outputs the MG2 torque Tm by using all or a part of the generated electric power Wg or using the electric power supplied from the battery 24 in addition to the generated electric power Wg.

In FIG. 4, a straight line L0m represented by one-dot chain line and the straight lines L1, L2, L3, L4 represented by the respective solid lines indicate the relationship among the rotational speeds of the rotary elements in forward running of the vehicle 10 in EV running mode in which the vehicle 10 is enabled to perform motor running (=EV running) with at least one of the first and second rotating machines MG1, MG2 being operated as the drive power source in a state in which the engine 12 is stopped. As the EV running in forward direction in the EV running mode, there are a one-motor-drive EV running and a two-motor-drive EV running, for example. In the one-motor-drive EV running, the vehicle 10 is caused to run with only the second rotating machine MG2 being operated as the drive power source. In the two-motor-drive EV running, the vehicle 10 is caused to run with both of the first and second rotating machines MG1, MG2 being operated as the drive power sources. In the one-motor-drive EV running, the carrier CA0 is not rotated, and the MG2 torque Tm acting as a positive torque is inputted to the ring gear R0 whereby the ring gear R0 is rotated in positive direction. In this instance, the first rotating machine MG1, which is connected to the sun gear S0, is placed in non-load state and is idled in negative direction. In the one-motor-drive EV running, the one-way clutch F0 is released so that the connection shaft 48 is not fixed to the casing 26.

In the two-motor-drive EV running, in a state in which the carrier CA0 is not rotated, when the MG1 torque Tg acting as a negative torque is inputted to the sun gear S0 whereby the sun gear S0 is rotated in negative direction, the one-way clutch F0 is automatically engaged so as to inhibit the carrier CA0 from being rotated in negative direction. While the carrier CA0 is fixed to be unrotatable by engagement of the one-way clutch F0, the MG1 torque Tg acts as a reaction torque on the ring gear R0. Further, in the two-motor-drive EV running, the MG2 torque Tm is inputted to the ring gear R0 as in the one-motor-drive EV running. In the state in which the carrier CA0 is not rotated, if the MG2 torque Tm is not inputted to the ring gear R0 when the MG1 torque Tg acting as the negative torque is inputted to the sun gear S0, the one-motor-drive EV running is performed with the MG1 torque Tg. In the forward running in the EV running mode, the engine rotational speed Ne is zeroed with the engine 12 being not operated, and the torque of at least one of the MG1 torque Tg and the MG2 torque Tm is transmitted, as a drive torque for driving the vehicle 10 to run in forward direction, to the transfer 30 through the step-variable transmission portion 46 in which one of the AT first to fourth gear positions is established. In the forward running in the EV running mode, the MG1 torque Tg acts as a negative torque in negative direction and serves as a power running torque, while the MG2 torque Tm acts as a positive torque in positive direction and serves as a power running torque.

In FIG. 4, the straight lines L0R, LR represented by respective broken lines indicate the relationship among the rotational speeds of the rotary elements in reverse running of the vehicle 10 in the EV running mode. In this reverse running in the EV running mode, the MG2 torque Tm acting as the negative torque in the negative direction is inputted to the ring gear R0, and is transmitted, as a drive torque for driving the vehicle 10 to run in reverse direction, to the transfer 30 through the step-variable transmission portion 46 in which the AT first gear position is established. In the vehicle 10, under controls executed by the electronic control apparatus 130, in a state in which the AT first gear position or other low-speed gear position among the plurality of AT gear positions is established, the MG2 torque Tm acting in the negative direction that is opposite to when the vehicle 10 runs in the forward direction, is outputted from the second rotating machine MG2 whereby the reverse running of the vehicle 10 can be performed. In the reverse running in the EV running mode, the MG2 torque Tm acts as a negative torque in the negative direction and serves as a power running torque. It is noted that, in the HV running mode, too, since the second rotating machine MG2 can be rotated in the negative direction as indicated by the straight line L0R, the reverse running of the vehicle 10 can be performed as in the EV running mode.

Figure 5:
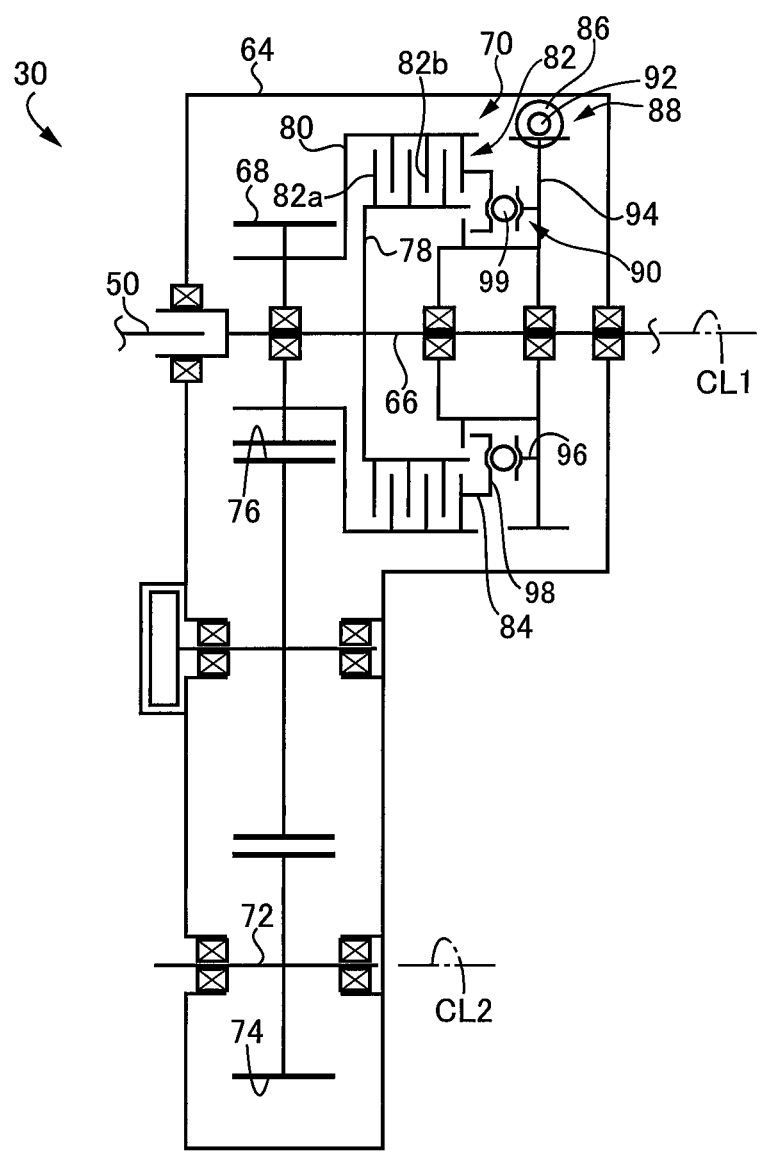
FIG. 5 is a view schematically showing a construction of a transfer shown in FIG. 1 and FIG. 2.

FIG. 5 is a view schematically showing a construction of the transfer 30. The transfer 30 includes a transfer casing 64 as a non-rotary member, a rear-wheel-side output shaft 66, a front-wheel driving gear 68 and a front-wheel drive clutch 70. The rear-wheel-side output shaft 66, front-wheel driving gear 68 and front-wheel drive clutch 70 are provided inside the transfer casing 64, and are disposed on a rotary axis CL1 that is common to the output shaft 66, driving gear 68 and drive clutch 70. The transfer 30 further includes a front-wheel-side output shaft 72, a front-wheel driven gear 74 and a front-wheel idler gear 76 that are provided inside the transfer casing 64, such that the front-wheel-side output shaft 72 and the front-wheel driven gear 74 are disposed on a rotary axis CL2 that is common to the output shaft 72 and driven gear 74. The rotary axis CL2 corresponds to axes of the front propeller shaft 32 and the front-wheel-side output shaft 72, for example.

The rear-wheel-side output shaft 66 is connected to the output shaft 50 in a power transmittable manner, and is connected to the rear propeller shaft 34 in a power transmittable manner, so that the drive power transmitted from the drive power source PU to the output shaft 50 though the automatic transmission 28 is to be outputted toward the rear wheels 16 by the rear-wheel-side output shaft 66. The output shaft 50 serves also as an input rotary member of the transfer 30, which is configured to input the drive power transmitted from the drive power source PU, to the rear-wheel-side output shaft 66 of the transfer 30, namely, serves as a drive-power transmission shaft configured to transmit the drive power transmitted from the drive power source PU, to the transfer 30. The automatic transmission 28 is an automatic transmission configured to transmit the drive power of the drive power source PU to the output shaft 50.

The front-wheel driving gear 68 is provided to be rotatable relative to the rear-wheel-side output shaft 66. The front-wheel drive clutch 70 is a multi-plate friction clutch configured to control a torque transmitted from the rear-wheel-side output shaft 66 to the front-wheel driving gear 68, namely, control a torque transmitted from the rear-wheel-side output shaft 66 to the front-wheel-side output shaft 72.

The front-wheel driven gear 74 is provided to be integral with the front-wheel-side output shaft 72, so as to be connected to the front-wheel-side output shaft 72 in a power transmittable manner. The front-wheel idler gear 76 is provided to mesh with the front-wheel driving gear 68 and the front-wheel driven gear 74, so as to connect between the front-wheel driving gear 68 and the front-wheel driven gear 74 in a power transmittable manner.

The front-wheel-side output shaft 72 is connected to the front-wheel driving gear 68 through the front-wheel driven gear 74 and the front-wheel idler gear 76 to the front-wheel driving gear 68 in a power transmittable manner, and is connected also to the front propeller shaft 32 in a power transmittable manner. The front-wheel-side output shaft 72 is configured to output a part of the drive power of the drive power source PU, which part is transmitted to the front-wheel driving gear 68 through the front-wheel drive clutch 70, so that the outputted part of the drive power is to be transmitted toward the front wheels 14.

The front-wheel drive clutch 70 includes a clutch hub 78, a clutch drum 80, frictional engagement elements 82 and a piston 84. The clutch hub 78 is connected to the rear-wheel-side output shaft 66 in a power transmittable manner. The clutch drum 80 is connected to the front-wheel driving gear 68 in a power transmittable manner. The frictional engagement elements 82 include a plurality of first friction plates 82a and a plurality of second friction plates 82b. The first friction plates 82a are provided to be movable in the direction of the rotary axis CL1 relative to the clutch hub 78 and to be unrotatable relative to the clutch hub 78. The second friction plates 82b are provided to be movable in the direction of the rotary axis CL1 relative to the clutch drum 80 and to be unrotatable relative to the clutch drum 80. The first and second friction plates 82a, 82b are alternately arranged and supposed on each other in the direction of the rotary axis CL1. The piston 84 is provided to be movable in the direction of the rotary axis CL1, so as to be brought into contact with the frictional engagement elements 82 and press the first and second friction plates 82a, 82b, thereby controlling a torque capacity of the front-wheel drive clutch 70, i.e., an engaging force of the front-wheel drive clutch 70. When the frictional engagement elements 82 are not pressed by the piston 84, the torque capacity of the front-wheel drive clutch 70 is zeroed whereby the front-wheel drive clutch 70 is released.

With the torque capacity, i.e., the engaging force of the front-wheel drive clutch 70 being controlled, the transfer 30 distributes the drive power of the drive power source PU transmitted through the automatic transmission 28, toward the rear-wheel-side output shaft 66 and the front-wheel-side output shaft 72. When the front-wheel drive clutch 70 is in its released state, namely, when a power transmission path between the rear-wheel-side output shaft 66 and the front-wheel driving gear 68 is cut off, the drive power of the drive power source PU transmitted to the transfer 30 through the automatic transmission 28 is transmitted toward the rear wheels 16 through, for example, the rear propeller shaft 34. When the front-wheel drive clutch 70 is in its slip-engaged state or fully engaged state, namely, when the power transmission path between the rear-wheel-side output shaft 66 and the front-wheel driving gear 68 is not cut off, a part of the drive power of the drive power source PU transmitted to the transfer 30 is transmitted toward the front wheels 14 through, for example, the front propeller shaft 32, and the remainder of the drive power of the drive power source PU transmitted to the transfer 30 is transmitted toward the rear wheels 16 through, for example, the rear propeller shaft 34. That is, the operation state of the front-wheel drive clutch 70 included in the transfer 30 is switched with the torque capacity, i.e., the engaging force of the front-wheel drive clutch 70 being controlled, whereby a part of the drive power outputted from the drive power source PU to the rear wheels 16 can be allocated to the front wheels 14.

The transfer 30 includes an electric motor 86, a worm gear 88 and a cam mechanism 90 that cooperate with one another to constitute a device configured to operate the front-wheel drive clutch 70.

The worm gear 88 is a pair of gears consisting of a worm 92 integrally formed on a motor shaft of the electric motor 86 and a worm wheel 94 provided with teeth that mesh with the worm 92. The worm wheel 94 is provided to be rotatable about the rotary axis CL1, so as to be rotated about the rotary axis CL1 when the electric motor 86 is rotated.

The cam mechanism 90 is provided between the worm wheel 94 and the piston 84 of the front-wheel drive clutch 70. The cam mechanism 90 includes a first member 96 connected to the worm wheel 94, a second member 98 connected to the piston 84, and a plurality of balls 99 interposed between the first and second members 96, 98, and is a mechanism configured to convert a rotary motion of the electric motor 86 into a linear motion.

The plurality of balls 99 are arranged equi-angularly in a circumferential direction about the rotary axis CL1. Each of first and second members 96, 98 has a cam groove provided in its contact surface that is in contact with the balls 99. The cam groove provided in the contact surface of each of the first and second members 96, 98 has a shape by which the first and second members 96, 98 are moved away from each other in the direction of the rotary axis CL1 when the first and second members 96, 98 are rotated relative to each other. Therefore, when the first and second members 96, 98 are rotated relative to each other, the first and second members 96, 98 are moved away from each other in the direction of the rotary axis CL1 whereby the piston 84 connected to the second member 98 is caused to press the frictional engagement elements 82. When the worm wheel 94 is rotated by the electric motor 86, a rotary motion of the worm wheel 94 is converted by the cam mechanism 90 into a liner motion in the direction of the rotary axis CL1 that is transmitted to the piston 84, and the frictional engagement elements 82 are pressed by the piston 84. A pressing force by which the piston 84 presses the frictional engagement elements 82 is controlled whereby the torque capacity, i.e., the engaging force of the front-wheel drive clutch 70 is controlled. With the engaging force of the front-wheel drive clutch 70, the front-wheel drive clutch 70 is capable of changing a drive-power distribution ratio Rx that is a ratio of distribution of the drive power of the drive power source PU, between the pair of front wheels 14 and the pair of rear wheels 16.

The drive-power distribution ratio Rx is, for example, a rear-wheel-side drive-power distribution ratio Xr that is a ratio of the drive power transmitted from the drive power source PU to the rear wheels 16, to all of the drive power transmitted from the drive power source PU to the rear and front wheels 16, 14. Alternatively, the drive-power distribution ratio Rx is, for example, a front-wheel-side drive-power distribution ratio Xf (=1−Xr) that is a ratio of the drive power transmitted from the drive power source PU to the front wheels 14, to all of the drive power transmitted from the drive power source PU to the rear and front wheels 16, 14. In the present embodiment in which the rear wheels 16 are the main drive wheels, the rear-wheel-side drive-power distribution ratio Xr, which is a ratio of the drive power transmitted to the main drive wheels, is used as the drive-power distribution ratio Rx.

When the piston 84 does not press the frictional engagement elements 82, the torque capacity of the front-wheel drive clutch 70 is zeroed. In this instance, the front-wheel drive clutch 70 is released whereby the rear-wheel-side drive-power distribution ratio Xr becomes 1.0. In other words, the drive-power distribution ratio Rx, which is the ratio of distribution of the drive power between the pair of front wheels 14 and the pair of rear wheels 16, i.e., (drive power transmitted to front wheels 14):(drive power transmitted to rear wheels 16), is 0:100 where 100 represents all of the drive power of the drive power source PU transmitted to the transfer 30. On the other hand, when the piston 84 presses the frictional engagement elements 82, the torque capacity of the front-wheel drive clutch 70 is made larger than 0, and the rear-wheel-side drive-power distribution ratio Xr is reduced with increase of the torque capacity of the front-wheel drive clutch 70. When the torque capacity of the front-wheel drive clutch 70 is maximized, namely, when the front-wheel drive clutch 70 is fully engaged, the rear-wheel-side drive-power distribution ratio Xr becomes 0.5, namely, the drive-power distribution ratio Rx becomes 50:50 that is an equilibrium state. Thus, the front-wheel drive clutch 70 is capable of changing the rear-wheel-side drive-power distribution ratio Xr within a range from 1.0 to 0.5, namely, changing the drive-power distribution ratio Rx within a range from 0:100 to 50:50, with the torque capacity of the front-wheel drive clutch 70 being controlled.

Referring back to FIG. 1, the four-wheel drive vehicle 10 is provided with a wheel brake device 100 which includes a brake master cylinder (not shown) and wheel brakes 101 that are provided for respective wheels 14, 16. The wheel brake device 100 is configured to apply braking forces generated by the respective wheel brakes 101, to the respective wheels 14, 16. The wheel brakes 101 consist of front brakes 101FR, 101FL provided for the respective front wheels 14R, 14L and rear brakes 101RR, 101RL provided for the respective rear wheels 16R, 16L. The wheel brake device 100 is configured to supply a brake hydraulic pressure to a wheel cylinder (not shown) provided in each of the wheel brakes 101, in accordance with, for example, an operation for depressing a brake pedal by the vehicle driver. In the wheel brake device 100, normally, the brake master cylinder is configured to generate a master-cylinder hydraulic pressure whose magnitude corresponds to a braking operation amount Bra, and the generated master-cylinder hydraulic pressure is supplied as the brake hydraulic pressure to the wheel cylinder. On the other hand, in the wheel brake device 100, for example, during execution of an ABS control, an anti-skid control or a vehicle-running-speed control, the brake hydraulic pressure required for execution of such a control is supplied to the wheel cylinder for enabling the wheel brakes 101 to generate the braking forces. The brake operation amount Bra is an operation amount of the brake pedal operated by the vehicle driver, which corresponds to a depressing force applied to the brake pedal. Thus, the wheel brake device 100 is capable of adjusting the braking forces generated by the wheel brakes 101 and applied to the wheels 14, 16.

Figure 6:
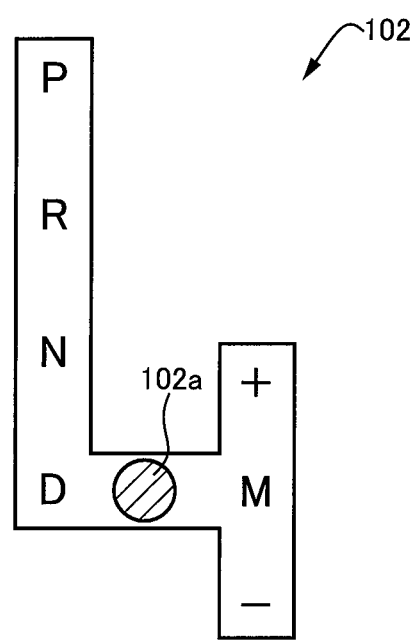
FIG. 6 is a view showing, by way of example, a shift operation device that is to be manipulated to switch from one of a plurality kinds of shift positions to another one of the shift positions.

FIG. 6 is a view showing, by way of example, a shift operation device 102 that is to be manipulated to switch from one of a plurality kinds of shift positions POSsh to another one of the shift positions POSsh. The shift operation device 102 includes a shift lever 102a which is disposed on a side of a driver's seat, for example, and which is to be manually operated by the vehicle driver so as to select one of the shift positions POSsh. The shift lever 102a is to be manually placed into one of a five shift operation positions "P", "R", "N", "D" and "M", for example, as shown in FIG. 6. The position "M" is a forward driving position for establishing a manual shift mode that enables a manual shifting operation by which one of the gear positions is to be switched to another one of the gear positions in the step-variable transmission portion 46 in response to the manual operation of the shift lever 102a by the vehicle driver. The position "M" is provided with a shift-up position "+" and a shift-down position "−". Each time when the shift lever 102a is placed into the shift-up position "+", a shift-up action is executed in the step-variable transmission portion 46 whereby a currently established one of the gear positions is switched to a higher-speed one of the gear positions in the step-variable transmission portion 46. Each time when the shift lever 102a is placed into the shift-down position "−", a shift-down action is executed in the step-variable transmission portion 46 whereby a currently established one of the gear positions is switched to a lower-speed one of the gear positions in the step-variable transmission portion 46. The operation of the shift lever 102a, i.e., a position into which the shift lever 102a is operated to placed, is detected by, for example, a shift position sensor 120, a shift-up switch and a shift-down switch. The shift lever 102a is automatically returned, by a biasing means such as a spring, to a home position that is located between the shift-up position "+" and the shift-down position "−". The shift-up action or the shift-down action is executed in the step-variable transmission portion 46, depending on a number of times of the operation by which the shift lever 102a is placed into the shift-up position "+" or the shift-down position "−".

Further, the four-wheel drive vehicle 10 is provided with the electronic control apparatus 130 as a controller that includes a control apparatus configured to control, for example, the drive power source PU and the transfer 30. FIG. 1 is a view showing an input/output system of the electronic control apparatus 130, and is a functional block diagram for explaining major control functions and control portions of the electronic control apparatus 130. For example, the electronic control apparatus 130 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 130 may be constituted by two or more control units exclusively assigned to perform different control operations such as an engine control operation and a shift control operation.

The electronic control apparatus 130 receives various input signals based on values detected by respective sensors provided in the four-wheel drive vehicle 10. Specifically, the electronic control apparatus 130 receives: an output signal of an engine speed sensor 103 indicative of an engine rotational speed Ne which is a rotational speed of the engine 12; an output signal of an output speed sensor 104 indicative of an output rotational speed No which corresponds to the running speed V of the vehicle 10; an output signal of a MG1 speed sensor 106 indicative of an MG1 rotational speed Ng which is a rotational speed of the first rotating machine MG1; an output signal of a MG2 speed sensor 108 indicative of an MG2 rotational speed Nm which is a rotational speed of the second rotating machine MG2 and which is equal to an AT input rotational speed Ni; an output signal of a wheel speed sensor 110 indicative of a wheel rotational speed Nr of each of the wheels 14, 16; an output signal of an accelerator-opening degree sensor 112 indicative of an accelerator opening degree θacc representing an amount of accelerating operation made by the vehicle driver; an output signal of a throttle-opening degree sensor 114 indicative of a throttle opening degree θth that is an opening degree of an electronic throttle valve; an output signal of a brake pedal sensor 116 indicative of a brake-ON signal Bon representing a state of depression of the brake pedal by the vehicle driver to operate the wheel brakes 101 and also a braking operation amount Bra representing an amount of depression of the brake pedal by the vehicle driver corresponding to the depressing force applied to the brake pedal; an output signal of a G senor 118 indicative of a longitudinal acceleration Gx and a lateral acceleration Gy of the vehicle 10; an output signal of the above-described shift position sensor 120 indicative of one of the shift positions POSsh that is selected by the shift lever 102a provided in the vehicle 10; an output signal of a yaw rate sensor 122 indicative of a yaw rate Ryaw that is a rate of change of a vehicle rotational angle about a vertical axis passing through a center of gravity of the vehicle 10; an output signal of a steering sensor 124 indicative of a steering angle θsw and a steering direction Dsw of a steering wheel provided in the vehicle 10; an output signal of a battery sensor 126 indicative of a battery temperature THbat, a battery charging/discharging electric current Ibat and a battery voltage Vbat of the battery 24; an output signal of a first fluid temperature sensor 128 indicative of a working fluid temperature THoil that is a temperature of the working fluid OIL; and an output signal of a second fluid temperature sensor 129 indicative of a fluid temperature THoil2 of an oil or fluid used in the front-wheel drive clutch 70 that is a wet clutch.

The electronic control apparatus 130 generates various command signals to the various devices provided in the four-wheel drive vehicle 10, such as: an engine control command signal Se that is to be supplied to the engine control device 20 for controlling the engine 12; a rotating-machine control command signal Smg that is to be supplied to the inverter 22 for controlling the first and second rotating machines MG1, MG2; a hydraulic-pressure control command signal Sat that is to be supplied to the hydraulic control unit 60 for controlling the operation states of the engagement devices CB; an electric-motor control command signal Sw that is to be supplied to the electric motor 86 for controlling the electric motor 86; and a brake control command signal Sb that is to be supplied to the wheel brake device 100 for controlling the braking forces generated by the wheel brakes 101.

For performing various control operations in the four-wheel drive vehicle 10, the electronic control apparatus 130 includes an AT-shift control means in the form of an AT-shift control portion 132, a hybrid control means in the form of a hybrid control portion 134, a four-wheel-drive control means in the form of four-wheel-drive control portion 136, a deceleration-running determination means in the form of a deceleration-running determination portion 138, a braking-force control means in the form of a braking-force control portion 140, a first state determination means in the form of a first state determination portion 142 and a second state determination means in the form of a second state determination portion 144.

Figure 7:
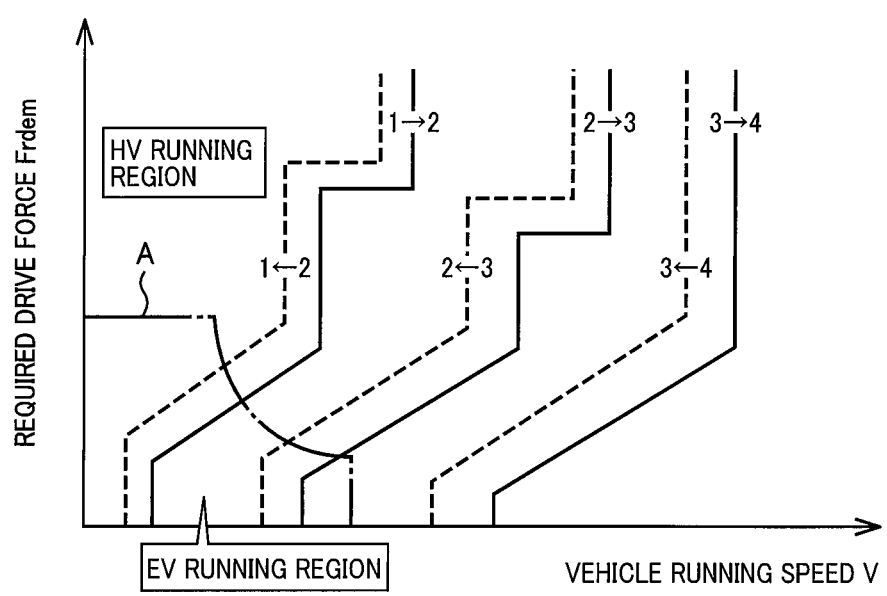
FIG. 7 is a view showing, by way of examples, an AT-gear-position shifting map used for controlling gear shifting in the step-variable transmission portion, a running-mode switching map used for switching a running mode, and a relationship between the AT-gear-position shifting map and the running-mode switching map.

The AT-shift control portion 132 is configured to determine whether a shifting action of the step-variable transmission portion 46 is to be executed, by using, for example, an AT gear position shift map as shown in FIG. 7, which is a relationship obtained by experimentation or determined by an appropriate design theory, and to output the hydraulic-pressure control command signal Sat supplied to the hydraulic control unit 60, so as to execute the shift control operation in the step-variable transmission portion 46 as needed. The AT gear position shifting map represents a predetermined relationship between two variables in the form of the vehicle running speed V and a required drive force Frdem, for example, which relationship is used to determine need of the shifting action of the step-variable transmission portion 46 and is represented by shifting lines in two-dimensional coordinates in which the running speed V and the required drive force Frdem are taken along respective two axes. It is noted that one of the two variables may be the output rotational speed No in place of the vehicle running speed V and that the other of the two variables may be a required drive torque Trdem, accelerator opening degree θacc or throttle valve opening degree θth in place of the required drive force Frdem. The shifting lines in the AT gear position shifting map consist of shift-up lines (indicated by solid lines in FIG. 7) for determining need of a shift-up action of the step-variable transmission portion 46, and shift-down lines (indicated by broken lines in FIG. 7) for determining need of a shift-down action of the step-variable transmission portion 46.

When the manual shift mode is selected with the shift lever 102a being placed in the above-described position "M", the AT-shift control portion 132 outputs the hydraulic-pressure control command signal Sat supplied to the hydraulic control unit 60 for executing the shift-up action in the step-variable transmission portion 46, in a case in which the shift lever 102a is placed in the shift-up position "+" by the vehicle driver, and outputs the hydraulic-pressure control command signal Sat supplied to the hydraulic control unit 60 for executing the shift-down action in the step-variable transmission portion 46, in a case in which the shift lever 102a is placed in the shift-down position "−" by the vehicle driver. The AT-shift control portion 132 causes the shift-down action to be executed in the step-variable transmission portion 46, in proportion with or in accordance with the number of times of the operation by which the shift lever 102a is placed into the shift-down position "−". Thus, the shift operation device 102 serves as a deceleration adjustment device that is configured to adjust a degree of deceleration of the vehicle 10, by a manual operation made by the vehicle driver by which the shift lever 102a is placed into the shift-down position "−" during deceleration running of the vehicle 10, wherein the deceleration is made by the engine brake that is a kind of drive power source brake (i.e., brake of the drive power source PU).

The hybrid control portion 134 has a function serving as an engine control means in the form of an engine control portion for controlling the operation of the engine 12 and a function serving as a rotating-machine control means or a rotating-machine control portion for controlling the operations of the first rotating machine MG1 and the second rotating machine MG2 via the inverter 22, and executes a hybrid drive control, for example, using the engine 12, the first rotating machine MG1 and the second rotating machine MG2 through these control functions.

The hybrid control portion 134 calculates a drive request amount in the form of the required drive force Frdem, by applying the accelerator opening degree θacc and the vehicle running speed V to, for example, a drive request amount map that represents a predetermined relationship. The required drive torque Trdem [Nm] applied to the drive wheels (front and rear wheels 14, 16), a required drive power Prdem [W] applied to the drive wheels, a required AT output torque applied to the output shaft 50, etc. can be used as the drive request amount, in addition to the required drive force Frdem [N]. The hybrid control portion 134 outputs the engine control command signal Se for controlling the engine 12 and the rotating-machine control command signal Smg for controlling the first and second rotating machines MG1, MG2, by taking account of a maximum chargeable amount Win of electric power that can be charged to the battery 24, and a maximum discharging amount Wout of electric power that can be discharged from the battery 24, such that the required drive power Prdem based on the required drive torque Trdem and the vehicle running speed V is obtained. The engine control command signal Se is, for example, a command value of an engine power Pe that is the power of the engine 12 outputting the engine torque Te at the current engine rotation speed Ne. The rotating-machine control command signal Smg is, for example, a command value of the generated electric power Wg of the first rotating machine MG1 outputting the MG1 torque Tg as the reaction torque of the engine torque Te at the MG1 rotation speed Ng which is the MG1 rotation speed Ng at the time of the command signal Smg output, and is a command value of a consumed electric power Wm of the second rotating machine MG2 outputting the MG2 torque Tm at the MG2 rotation speed Nm which is the MG2 rotation speed Nm at the time of the command signal Smg output.

The maximum chargeable amount Win of the battery 24 is a maximum amount of the electric power that can be charged to the battery 24, and indicates an input limit of the battery 24. The maximum dischargeable amount Wout of the battery 24 is a maximum amount of the electric power that can be discharged from the battery 24, and indicates an output limit of the battery 24. The maximum chargeable and dischargeable amounts Win, Wout are calculated by the electronic control apparatus 130, for example, based on a battery temperature THbat and a state of charge SOC [%] of the battery 24. The state of charge SOC of the battery 24 is a value indicative of a charged state of the battery 24, i.e., an amount of the electric power stored or remaining in the battery 24, and is calculated by the electronic control apparatus 130, for example, based on the charging/discharging electric current Ibat and the voltage Vbat of the battery 24.

For example, when the automatic transmission 28 is operated as a continuously variable transmission as a whole by operating the continuously variable transmission portion 44 as a continuously variable transmission, the hybrid control portion 134 controls the engine 12 and controls the generated electric power Wg of the first rotating machine MG1 so as to attain the engine rotational speed Ne and the engine torque Te at which the engine power Pe achieving the required drive power Prdem is acquired in consideration of an engine optimum fuel consumption point etc., and thereby provides the continuously variable shift control of the continuously variable transmission portion 44 to change the gear ratio γ0 of the continuously variable transmission portion 44. As a result of this control, the gear ratio γt (=γ0×γat=Ne/No) of the automatic transmission 28 is controlled in the case of operating the automatic transmission 28 as a continuously variable transmission. The above-described engine optimum fuel consumption point is predetermined as an optimum engine operation point, i.e., an engine operation point that maximizes a total fuel efficiency in the four-wheel drive vehicle 10 including not only a fuel efficiency of the engine 12 but also a charge/discharge efficiency of the battery 24, for example, when the required engine power Pedem is to be acquired. The engine operation point is an operation point of the engine 12 which is defined by a combination of the engine rotational speed Ne and the engine torque Te.

For example, when the automatic transmission 28 is operated as a step-variable transmission as a whole by operating the continuously variable transmission portion 44 as in a step-variable transmission, the hybrid control portion 134 uses a predetermined relationship, for example, a step-variable gear position shift map, to determine need of a shifting action of the automatic transmission 28 and provides the shift control of the continuously variable transmission portion 44 so as to selectively establish the plurality of gear positions in coordination with the shift control of the AT gear position of the step-variable transmission portion 46 by the AT-shift control portion 132. The plurality of gear positions can be established by controlling the engine rotational speed Ne by the first rotating machine MG1 depending on the output rotational speed No so as to maintain the respective gear ratios γt.

The hybrid control portion 134 selectively establishes the motor running mode or the hybrid running mode as the running mode depending on a running state, so as to cause the vehicle 10 to run in a selected one of the running modes. For example, the hybrid control portion 134 establishes the EV running mode when the required drive power Prdem is in an EV running region smaller than a predetermined threshold value, and establishes the HV running mode when the required drive power Prdem is in an HV running region equal to or greater than the predetermined threshold value. In FIG. 7, one-dot chain line A is a boundary line between the HV running region and the EV running region, for switching between the HV running mode and the EV running mode. A predetermined relationship having the boundary line as indicated by the one-dot chain line A of FIG. 7 is an example of a running-mode switching map defined by the two-dimensional coordinates of variables in the form of the vehicle running speed V and the required drive force Frdem. It is noted that, in FIG. 7, the running-mode switching map is shown together with AT gear position shift map, for convenience of the description.

In the EV running mode, when the required drive power Prdem can be obtained only by the second rotating machine MG2, the hybrid control portion 134 causes the four-wheel drive vehicle 10 to run in the one-motor-drive EV running with only the second rotating machine MG2 being operated as the drive power source PU. On the other hand, when the required drive power Prdem cannot be obtained only by the second rotating machine MG2 in the EV running mode, the hybrid control portion 134 causes the vehicle 10 to run in the two-motor-drive EV running. However, even when the required drive power Prdem can be obtained only by the second rotating machine MG2, the vehicle 10 may be caused to run in the two-motor-drive EV running, if the use of both of the first rotating machine MG1 and second rotating machine MG2 provides better efficiency than the use of only the second rotating machine MG2.

Even when the required drive power Prdem is in the EV running region, the hybrid control portion 134 establishes the HV running mode, for example, in a case in which the state of charge SOC of the battery 24 becomes less than a predetermined engine-start threshold value or in a case in which the engine 12 needs to be warmed up. The engine-start threshold value is a predetermined threshold value for determining that the state of charge SOC reaches a level at which the battery 24 needs to be charged by automatically starting the engine 12.

The hybrid control portion 134 executes an engine start control operation for starting the engine 12, in a case in which the HV running mode is established by the hybrid control portion 134 when the engine 12 is being stopped. When starting the engine 12, the hybrid control portion 134 increases the engine rotational speed Ne, for example, by the first rotating machine MG1, and then ignites the engine 12 when the engine rotational speed Ne has been increased to an ignitable speed or higher so as to start the engine 12. The ignitable speed is a predetermined speed value in which the engine 12 can be ignited. That is, the hybrid control portion 134 starts the engine 12, by cranking the engine 12 by first rotating machine MG1.

The four-wheel-drive control portion 136 controls the rear-wheel-side drive-power distribution ratio Xr. The four-wheel-drive control portion 136 determines a target ratio value of the rear-wheel-side drive-power distribution ratio Xr, which is dependent on the running state of the four-wheel drive vehicle 10 that is obtained through, for example, the output speed sensor 104 and the G sensor 118. Then, the four-wheel-drive control portion 136 outputs the electric-motor control command signal Sw for controlling the electric motor 86 such that the rear-wheel-side drive-power distribution ratio Xr is controlled to the target ratio value with the torque capacity, i.e., the engaging force of the front-wheel drive clutch 70 being controlled.

When the four-wheel drive vehicle 10 is running straight, for example, the four-wheel-drive control portion 136 controls the rear-wheel-side drive-power distribution ratio Xr to 1.0, namely, controls the drive-power distribution ratio Rx to 0:100, by releasing the front-wheel drive clutch 70. Further, when the vehicle 10 is turning, the four-wheel-drive control portion 136 calculates a target yaw rate Ryawtgt, based on, for example, the steering angle θsw and the vehicle running speed V during turning of the vehicle 10, and controls the rear-wheel-side drive-power distribution ratio Xr such that the yaw rate Ryaw, which is constantly detected by the yaw rate sensor 122, follows the target yaw rate Ryawtgt.

The deceleration-running determination portion 138 determines whether the vehicle 10 is running with deceleration or not, based on a determination as to whether the vehicle running speed V is being reduced or not, wherein the determination cam be made by using, for example, the output speed sensor 104.

When it is determined by the deceleration-running determination portion 138 that the vehicle 10 is running with deceleration, the braking-force control portion 140 calculates a target degree of deceleration, for example, based on the accelerating operation (e.g., the accelerator opening degree θacc, a rate of reduction of the accelerator opening degree θacc) made by the vehicle driver, the running speed V, a gradient of downhill road and the braking operation (e.g., the braking operation amount Bra, a rate of increase of the braking operation amount Bra), and determines a required braking force that realizes the target degree of deceleration, by using a predetermined relationship. During deceleration running of the vehicle 10, the braking-force control portion 140 controls a total braking force acting on the vehicle 10, so as to obtain the required braking force. The total braking force acting on the vehicle 10 is constituted, for example, by a regenerative braking force that is the braking force generated by the second rotating machine MG2 subjected to a regenerative control, a service braking force that is the braking force generated by the wheel brakes 101, and an engine braking force that is the braking force generated by the engine 12. The regenerative braking force is generated with a higher priority, for example, in view of improvement of an energy efficiency. When it is determined by the first state determination portion 142 that the heat load Q of the front-wheel drive clutch 70 is small, for example, the braking-force control portion 140 outputs a command requesting execution of the regenerative control by which the regenerative torque Tmdem required for the regenerative braking force is to be generated by the second rotating machine MG2, and the outputted command is supplied to the hybrid control portion 134. The regenerative control to which the second rotating machine MG2 is to be subjected is a control for causing the second rotating machine MG2 to be rotated and driven by a driven torque inputted from each of the wheels 14, 16 so as to be operated as the generator, such that the battery 24 is charged with the generated electric power through the inverter 22. The braking-force control portion 140 realizes the required braking force by exclusively the regenerative braking force, for example, when the required braking force is relatively small, and realizes the required braking force by the braking force generated by the wheel brakes 101 in addition to the regenerative braking force, for example, when the required braking force is relatively large. Further, shortly before the vehicle 10 is stopped, for example, the braking-force control portion 140 realizes the required braking force by replacing the regenerative braking force with the braking force generated by the wheel brakes 101.

When it is determined by the deceleration-running determination portion 138 that the vehicle 10 is running with deceleration, the first state determination portion 142 determines whether the heat load Q of the front-wheel drive clutch 70 is large or not. For example, the first state determination portion 142 determines whether the heat load Q [J] of the front-wheel drive clutch 70 is larger than a predetermined threshold value Q1 [J] or not, so that the first state determination portion 142 determines that the heat load Q of the front-wheel drive clutch 70 is large when determining that the heat load Q of the front-wheel drive clutch 70 is larger than the threshold value Q1, and determines that the heat load Q of the front-wheel drive clutch 70 is small when determining that the heat load Q of the front-wheel drive clutch 70 is not larger than the threshold value Q1. The threshold value Q1 is an upper limit of an amount of heat that can be applied to the front-wheel drive clutch 70 without affecting durability of the front-wheel drive clutch 70 in a slipped state of the front-wheel drive clutch 70. For example, the heat load Q of the front-wheel drive clutch 70, which is the amount of heat applied to the front-wheel drive clutch 70, can be estimated (Q=Qa−Qb) from a heat generation amount Qa [J] and a heat dissipation amount Qb [J], wherein the heat generation amount Qa is an amount of heat generated in the front-wheel drive clutch 70 by slipping of the front-wheel drive clutch 70 during deceleration running of the vehicle 10, and the heat dissipation amount Qb is an amount of heat dissipated from the front-wheel drive clutch 70 through the fluid or oil used in the front-wheel drive clutch 70 as the wet clutch during deceleration running of the vehicle 10. The heat generation amount Qa can be calculated, for example, by using a slip amount Nslip [rpm] of the front-wheel drive clutch 70 (which is detected at every sampling time during deceleration running of the vehicle 10) and an input torque Tin [Nm] (which is inputted to the front-wheel drive clutch 70), and estimating amount values Qa_1, Qa_2, . . . Qa_n−1, Qa_n of the heat generation amount Qa at respective sampling times. That is, the heat generation amount Qa can be obtained by summing (integrating) the estimated amount values Qa_1, Qa_2, . . . Qa_n−1, Qa_n of the heat generation amount Qa ($Qa = Qa\_1 + Qa\_2 + \ldots + Qa\_{n-1} + Qa\_n$), for example. The slip amount Nslip is a difference between a rotational speed of the clutch hub 78 and a rotational speed of the clutch dram 80, which can be calculated or obtained through the output speed sensor 104 and the wheel speed sensor 110, for example. The input torque Tin can be estimated, for example, from the rotating-machine control command signal Smg and the electric-motor control command signal Sw that are outputted by the electronic control apparatus 130, namely, from the regenerative torque Tm of the second rotating machine MG2 and the front-wheel-side drive-power distribution ratio Xf. Further, the heat dissipation amount Qb can be calculated, for example, by using a difference between an outside temperature and the fluid temperature THoil2 of the oil or fluid in the front-wheel drive clutch 70, which are detected at every sampling time during deceleration running of the vehicle 10, and estimating amount values $Qb\_1, Qb\_2, \ldots Qb\_{n-1}, Qb\_n$ of the heat dissipation amount Qb at respective sampling times. That is, the heat dissipation amount Qb can be obtained by summing (integrating) the estimated amount values $Qb\_1, Qb\_2, \ldots Qb\_{n-1}, Qb\_n$ of the heat dissipation amount Qb ($Qb = Qb\_1 + Qb\_2 + \ldots + Qb\_{n-1} + Qb\_n$), for example.

As shown in FIG. 1, the first state determination portion 142 includes a threshold-value change means in the form of a threshold-value change portion 142a, and the threshold-value change portion 142a includes a deceleration-request determination means in the form of a deceleration-request determination portion 142b. When it is determined by the deceleration-running determination portion 138 that the vehicle 10 is running with deceleration, the deceleration-request determination portion 142b determines whether deceleration of the vehicle 10 is requested through an manual operation made by the vehicle driver, or not. The deceleration-request determination portion 142b determines that the deceleration is requested through the manual operation made by the vehicle driver, for example, when the shift lever 102a is placed in the position "M" and is placed in the shift-down position "−" by the manual operation.

When it is determined by the deceleration-request determination portion 142b that the deceleration is requested through the manual operation made by the vehicle driver, the threshold-value change portion 142a changes the threshold value Q1 used in the first state determination portion 142 such that the threshold value Q1 is increased. For example, the threshold-value change portion 142a changes the threshold value Q1 such that the threshold value Q1 is increased in proportion with the number of times of the operation by which the shift lever 102a is placed into the shift-down position "−".

Further, when it is determined by the first state determination portion 142 that the heat load Q of the front-wheel drive clutch 70 is larger than the threshold value Q1, the threshold-value change portion 142a changes the threshold value Q1 used in the first state determination portion 142 to another threshold value that is smaller than the threshold value Q1, namely, sets a limitation-cancellation value Qr that is smaller than the threshold value Q1.

When it is determined by the first state determination portion 142 that the heat load Q of the front-wheel drive clutch 70 is larger than the threshold value Q1, the second state determination portion 144 determines whether the state of charge SOC of the battery 24 (upon the determination by the first state determination portion 142 that the heat load Q is larger than the threshold value Q1) is a predetermined value SOC1 [%] or more. The predetermined value SOC1 is a value relative to a maximum amount of the electric power stored in the battery 24, is determined such that it is considered that a service life of the battery 24 could be affected if the battery 24 is charged to the predetermined value SOC1 or more.

When a predetermined first condition CD1 and a predetermined second condition CD2 are both satisfied, the braking-force control portion 140 outputs a command requesting execution of the regenerative control of the second rotating machine MG2 such that the regenerative torque Tmdem required for the regenerative braking force is limited until a predetermined third condition CD3 is satisfied. The outputted command is supplied to the hybrid control portion 134. For example, the outputted command requests the hybrid control portion 134 to execute the regenerative control of the second rotating machine MG2 such that the regenerative torque Tmdem is limited to a limited regenerative torque Tmlim that is obtained by multiplying the regenerative torque Tmdem by a predetermined ratio R ($<1$), namely, such that the regenerative torque Tmdem is reduced at a predetermined reduction ratio, when the first and second conditions CD1, CD2 are satisfied until the third condition CD3 is satisfied. When the third condition CD3 is satisfied, the braking-force control portion 140 outputs a command requesting execution of the regenerative control of the second rotating machine MG2 such that the limitation of the regenerative torque Tmdem is released or cancelled, namely, such that the regenerative torque Tmdem required for the regenerative braking force is obtained. The outputted command is supplied to hybrid control portion 134. The above-described first condition CD1 is a condition that is to be satisfied when it is determined by the first state determination portion 142 that the heat load Q of the front-wheel drive clutch 70 is larger than the threshold value Q1. The above-described second condition CD2 is a condition that is to be satisfied when it is determined by the second state determination portion 144 that the state of charge SOC of the battery 24 is not smaller than the predetermined value SOC1. The above-described third condition CD3 is a condition that is to be satisfied when it is determined by the first state determination portion 142 that the heat load Q of the front-wheel drive clutch 70 has become not larger than the limitation-cancellation value Qr. The above-described predetermined ratio R is a predetermined constant ratio value at which the regenerative torque Tmdem is to be reduced, for reducing the heat load Q of the front-wheel drive clutch 70. When the total braking force acting on the vehicle 10 is made smaller than the required braking force, due to the limitation of the regenerative torque Tmdem in the regenerative control of the second rotating machine MG2, the braking-force control portion 140 controls the braking force of each of the wheel brakes 101, such that the shortage of the total braking force acting on the vehicle 10 is compensated by the braking force of each of the wheels brakes 101, and such that a ratio between the braking force (i.e., a part of the total braking force) applied to each of the rear wheels 16 and the braking force (i.e., a part of the total braking force) applied to each of the front wheels 14 becomes substantially equal to the drive-power distribution ratio Rx, i.e., the rear-wheel-side drive-power distribution ratio Xr.

When the first condition CD1 and a predetermined fourth condition CD4 are both satisfied, until the third condition CD3 is satisfied, the four-wheel-drive control portion 136 changes the drive-power distribution ratio Rx, i.e., the rear-wheel-side drive-power distribution ratio Xr, such that the heat load Q of the front-wheel drive clutch 70 is reduced. Specifically, when the first condition CD1 and the fourth condition CD4 are both satisfied, until the third condition CD3 is satisfied, the four-wheel-drive control portion 136 changes the rear-wheel-side drive-power distribution ratio X such that the rear-wheel-side drive-power distribution ratio Xr becomes 1.0, or such that the rear-wheel-side drive-power distribution ratio Xr becomes 0.5. The above-described four condition CD4 is a condition that is to be satisfied when it is determined by the second state determination portion 144 that the state of charge SOC of the battery 24 is smaller than the predetermined value SOC1. When the rear-wheel-side drive-power distribution ratio Xr is 1.0, the front-wheel drive clutch 70 is released. When the rear-wheel-side drive-power distribution ratio Xr is 0.5, the front-wheel drive clutch 70 is completely engaged. When the front-wheel drive clutch 70 is either released or completely engaged, the heat load Q due to slipping of the front-wheel drive clutch 70 is appropriately reduced. That is, the four-wheel-drive control portion 136 includes a control function of changing the rear-wheel-side drive-power distribution ratio Xr to 1.0 or 0.5, for reducing the heat load Q of the front-wheel drive clutch 70 when it is determined that the heat load Q of the front-wheel drive clutch 70 is larger than the threshold value Q1 during deceleration running of the vehicle 10.

Figure 8:
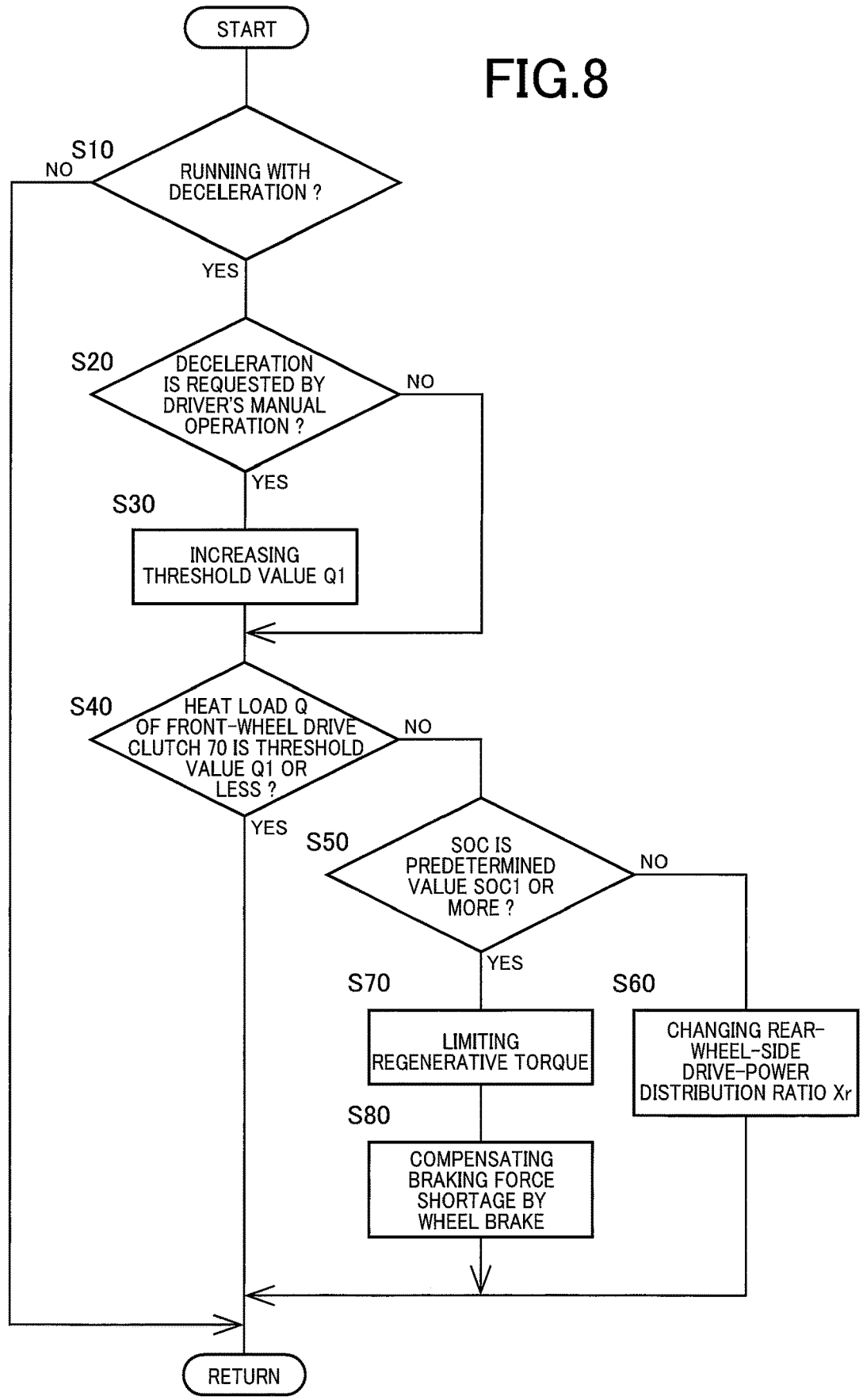
FIG. 8 is a flow chart showing a main part of a control routine executed by an electronic control apparatus, namely, a control routine that is executed for a regenerative control through a second rotating machine during deceleration running of the vehicle.

FIG. 8 is a flow chart showing a main part of a control routine executed by the electronic control apparatus 130, namely, a control routine that is executed, for example, for the regenerative control through the second rotating machine MG2 during deceleration running of the vehicle 10.

As shown in FIG. 8, the control routine is initiated with step S10 corresponding to function of the deceleration-running determination portion 138, which is implemented to determine whether the vehicle 10 is running with deceleration or not. When a negative determination is made at step S10, namely, when the deceleration running is not being performed by the vehicle 10 and accordingly the regenerative control of the second rotating machine MG2 is not executed, one cycle of execution of the control routine is terminated. When an affirmative determination is made at step S10, namely, when the deceleration running is being performed by the vehicle 10 and accordingly the regenerative control of the second rotating machine MG2 is executed for obtaining the regenerative torque Tmdem required for the regenerative braking force, the control flow goes to step S20 corresponding to function of the deceleration-request determination portion 142b, which is implemented to determine whether the deceleration of the vehicle 10 is requested through the manual operation made by the vehicle driver, or not. When an affirmative determination is made at step S20, namely, when the shift lever 102a is manually operated by the vehicle driver to placed into the shift-down position "−", step S30 corresponding to function of the threshold-value change portion 142a is implemented. When a negative determination is made at step S20, namely, when the shift lever 102a is not manually operated by the vehicle driver to placed into the shift-down position "−", step S40 corresponding to function of the first state determination portion 142 is implemented.

At step S30, the threshold value Q1 is changed so as to be increased in proportion with the number of times of the operation by which the shift lever 102a is placed into the shift-down position "−". At step S40, it is determined whether the heat load Q of the front-wheel drive clutch 70 is the threshold value Q1 or less. When an affirmative determination is made at step S40, namely, when it is determined that the heat load Q of the front-wheel drive clutch 70 is small, one cycle of execution of the control routine is terminated. When a negative determination is made at step S40, namely, when it is determined that the heat load Q of the front-wheel drive clutch 70 is large, the control flow goes to step S50 corresponding to function of the second state determination portion 144, which is implemented to determine whether the state of charge SOC of the battery 24 is the predetermined value SOC1 or more. When a negative determination is made at step S50, namely, when the state of charge SOC is smaller than the predetermined value SOC1 and accordingly the fourth condition CD4 as well as the first condition CD1 is satisfied, the control flow goes to step S60 corresponding to function of the four-wheel-drive control portion 136. When an affirmative determination is made at step S50, namely, when the state of charge SOC is not smaller than the predetermined value SOC1 and accordingly the second condition CD2 as well as the first condition CD1 is satisfied, the control flow goes to step S70 corresponding to functions of the hybrid control portion 134 and the braking-force control portion 140.

At step S60, the rear-wheel-side drive-power distribution ratio Xr is changed, for example, such that the distribution ratio Xr becomes 1.0. At step S70, the regenerative torque Tmdem required for the regenerative braking force is limited. Step S70 is followed by step S80 at which the braking force of each of the wheel brakes 101 is controlled, such that the shortage of the total braking force acting on the vehicle 10, which shortage is caused by the limitation of the regenerative torque Tmdem made at step S70, is compensated by the braking force of each of the wheels brakes 101, and such that the ratio between the braking force applied to each of the rear wheels 16 and the braking force applied to each of the front wheels 14 becomes substantially equal to the drive-power distribution ratio Rx.

As described, in the four-wheel drive vehicle 10 according to the present embodiment, the electronic control apparatus 130 is configured, during the deceleration running of the vehicle 10, to determine whether the heat load Q of the front-wheel drive clutch 70 is large or not, and to limit the regenerative torque Tmdem of the second rotating machine MG2 when determining that the heat load Q is large, as compared with when determining that the heat load Q is small. Thus, the regenerative torque Tmdem of the second rotating machine MG2 is limited by the electronic control apparatus 130 when it is determined that the heat load Q of the front-wheel drive clutch 70 is large during the deceleration running of the vehicle 10. Owing to this arrangement, the heat load Q of the front-wheel drive clutch 70 can be reduced without the drive-power distribution ratio Rx being changed, so that it is possible to suppress reduction of durability of the front-wheel drive clutch 70.

In the four-wheel drive vehicle 10 according to the according to the present embodiment, each of the rear and front wheels 16, 14 is provided with the wheel brake 101 that is configured to apply the braking force to the each of the rear and front wheels 16, 14, wherein the electronic control apparatus 130 is configured, when limiting the regenerative torque Tmdem of the second rotating machine MG2, to control the braking force applied by the wheel brake 101 to each of the rear and front wheels 16, 14, so as to compensate a shortage of the total braking force acting on the vehicle 10, which shortage is due to the limitation of the regenerative torque Tmdem of the second rotating machine MG2. Owing to this arrangement, when the regenerative torque Tmdem of the second rotating machine MG2 is limited, the electronic control apparatus 130 controls the braking force applied by the wheel brake 101 to each of the rear and front wheels 16, 14, such that the shortage of the total braking force acting on the vehicle 10, which shortage is due to the limitation of the regenerative torque Tmdem of the second rotating machine MG2, is compensated whereby the shortage of the total braking force acting on the vehicle 10 can be suppressed.

In the four-wheel drive vehicle 10 according to the present embodiment, the electronic control apparatus 130 is configured, when compensating the shortage of the total braking force acting on the vehicle 10, to control the braking force applied by the wheel brake 101 to each of the rear and front wheels 16, 14, such that the ratio between a part of the total braking force applied to each of the rear wheels 16 and a part of the total braking force applied to each of the front wheels 14 becomes substantially equal to the drive-power distribution ratio Rx. Thus, the ratio between the part of the total braking force applied to each of the rear wheels 16 and the part of the total braking force applied to each of the front wheels 14 becomes substantially equal to the drive-power distribution ratio Rx. Owing to this arrangement, it is possible to appropriately suppress change of attitude of the vehicle 10.

In the four-wheel drive vehicle 10 according to the present embodiment, the electronic control apparatus 130 further has a function of changing the drive-power distribution ratio Rx such that the heat load Q of the front-wheel drive clutch 70 is reduced, when determining that the heat load Q is large during the deceleration running of the vehicle 10, wherein the electronic control apparatus 130 is configured, when the heat load Q of the front-wheel drive clutch 70 is to be reduced upon determination that the heat load Q is large during the deceleration running of the vehicle 10, to limit the regenerative torque Tmdem of the second rotating machine MG2 in a case in which the state of charge SOC that is an amount of the electric power remaining in the battery 24 is not smaller than the predetermined value SOC1, and to change the drive-power distribution ratio Rx such that the heat load Q of the front-wheel drive clutch 70 is reduced in a case in which the state of charge SOC is smaller than the predetermined value SOC1. Thus, when it is determined that the heat load Q of the front-wheel drive clutch 70 in the case in which the state of charge SOC is smaller than the predetermined value SOC1, the heat load Q of the front-wheel drive clutch 70 is reduced by changing the drive-power distribution ratio Rx in a manner that reduces the heat load Q of the front-wheel drive clutch 70 without limiting the regenerative torque Tmdem of the second rotating machine MG2. Owing to this arrangement, it is possible to appropriately suppress reduction of an energy efficiency.

In the four-wheel drive vehicle 10 according to the present embodiment, the electronic control apparatus 130 is configured, during the deceleration running of the vehicle 10, to determine that the heat load Q of the front-wheel drive clutch 70 is large when the heat load Q of the front-wheel drive clutch 70 is larger than the predetermined threshold value Q1, and to determine that the heat load Q of the front-wheel drive clutch 70 is small when the heat load Q of the front-wheel drive clutch 70 is not larger than the threshold value Q1. Thus, during the deceleration running of the vehicle 10, the electronic control apparatus 130 can limit the regenerative torque Tmdem of the second rotating machine MG2, when the heat load Q of the front-wheel drive clutch 70 is larger than the threshold value Q1.

In the four-wheel drive vehicle 10 according to the present embodiment, the electronic control apparatus 130 is configured, when the heat load Q of the front-wheel drive clutch 70 has become larger than the threshold value Q1, to limit the regenerative torque Tmdem of the second rotating machine MG2, and to set the limitation-cancellation value Qr that is smaller than the threshold value Q1, and the electronic control apparatus 130 is configured, when the heat load Q of the front-wheel drive clutch 70 has become not larger than the limitation-cancellation value Qr, to cancel the limitation of the regenerative torque Tmdem of the second rotating machine MG2. Owing to this arrangement, it is possible to appropriately reduce the heat load Q of the front-wheel drive clutch 70, because the electronic control apparatus 130 can limit the regenerative torque Tmdem of the second rotating machine MG2 for a relatively large length of time from a point of time at which the heat load Q of the front-wheel drive clutch 70 becomes larger than the threshold value Q1 until a point of time at which the heat load Q of the front-wheel drive clutch 70 becomes not larger than the limitation-cancellation value Qr that is smaller than the threshold value Q1.

In the four-wheel drive vehicle 10 according to the present embodiment, there is further provided the shift operation device 102 that is to be manually operated by the vehicle driver during the deceleration running of the vehicle 10, so as to adjust the degree of deceleration of the vehicle 10, wherein the electronic control apparatus 130 is configured, when the shift lever 102a of the shift operation device 102 is manually operated by the vehicle driver to be placed into the shift-down position "−", to change the threshold value Q1 such that the threshold value Q1 is increased. Thus, during the deceleration running of the vehicle 10, the threshold value Q1 is increased with the shift lever 102a of the shift operation device 102 being manually operated by the vehicle driver to be placed into the shift-down position "−", so that the limitation of the regenerative torque Tmdem of the second rotating machine MG2 is alleviated whereby a drivability or operability of the vehicle 10 is increased.

While the preferred embodiment of this invention has been described in detail by reference to the drawings, it is to be understood that the invention may be otherwise embodied.

For example, in the above-described embodiment, when the heat load Q of the front-wheel drive clutch 70 is larger than the threshold value Q1, the regenerative torque Tmdem of the second rotating machine MG2 is limited and reduced by multiplying the regenerative torque Tmdem required for the regenerative braking force by the predetermined ratio R(<1). However, the regenerative torque Tmdem of the second rotating machine MG2 may be limited by reducing a maximum value of the regenerative torque outputtable by the second rotating machine MG2, for example.

In the above-described embodiment, the predetermined ratio R is a constant value so that, when the heat load Q of the front-wheel drive clutch 70 is larger than the threshold value Q1, the regenerative torque Tmdem is reduced at a predetermined constant reduction ratio irrespective of how large is the difference between the heat load Q of the front-wheel drive clutch 70 and the threshold value Q1. However, for example, the reduction ratio may be variable, such that the reduction ratio is increased in proportion with increase of the difference between the heat load Q of the front-wheel drive clutch 70 and the threshold value Q1, or such that the reduction ratio is increased in steps as the difference between the heat load Q of the front-wheel drive clutch 70 and the threshold value Q1 is increased. With any one of these arrangements, it is possible to appropriately reduce the increased heat load Q of the front-wheel drive clutch 70.

In the above-described embodiment, when the heat load Q of the front-wheel drive clutch 70 becomes larger than the threshold value Q1, the regenerative torque Tmdem of the second rotating machine MG2 is limited, and the threshold value Q1 is replaced by the limitation-cancellation value Qr that is smaller than the threshold value Q1 so that the limitation of the regenerative torque Tmdem of the second rotating machine MG2 is released or cancelled when the heat load Q of the front-wheel drive clutch 70 becomes not larger than the limitation-cancellation value Qr. However, this arrangement may be modified such that, when the heat load Q of the front-wheel drive clutch 70 becomes larger than the threshold value Q1, the regenerative torque Tmdem of the second rotating machine MG2 is limited, without replacing the threshold value Q1 by the limitation-cancellation value Qr, so that the limitation of the regenerative torque Tmdem of the second rotating machine MG2 is released or cancelled when the heat load Q of the front-wheel drive clutch 70 becomes not larger than the threshold value Q1.

In the above-described embodiment, the threshold value Q1 is changed to be increased by the electronic control apparatus 130, when the shift lever 102a of the shift operation device 102 is manually operated by the vehicle driver to be placed into the shift-down position "−". However, for example, where a paddle switch is provided in a steering wheel, for executing a shift-down action, the threshold value Q1 may be changed to be increased by the electronic control apparatus 130, also when the paddle switch is manually operated by the vehicle driver. It is noted that the paddle switch provided for executing the shift-down action serves as a deceleration-degree adjustment device that is configured, when being manually operated by the vehicle driver during deceleration running of the vehicle 10, to cause the shift-down action in the step-variable transmission portion 46 so as to adjust a degree of deceleration of the vehicle 10 by the engine brake that is a kind of drive power source brake (i.e., brake of the drive power source PU). Further, where the vehicle 10 is provided with a deceleration-degree selection switch for increasing the regenerative torque (regenerative braking force) of the second rotating machine MG2 in steps depending on the number of times of manual operation of the deceleration-degree selection switch by the vehicle driver, the threshold value Q1 may be changed to be increased by the electronic control apparatus 130, also when the deceleration-degree selection switch is manually operated by the vehicle driver. It is noted that the deceleration-degree selection switch serves as the deceleration-degree adjustment device that is configured, when being manually operated by the vehicle driver during deceleration running of the vehicle 10, to increase the regenerative torque of the second rotating machine MG2 so as to adjust the degree of deceleration of the vehicle 10 by the regenerative brake that is a kind of drive power source brake (i.e., brake of the drive power source PU).

In the above-described embodiment, the first state determination portion 142 is configured to determine whether the heat load Q of the front-wheel drive clutch 70 is larger than the threshold value Q1 or not, by using, for example, the slip amount Nslip of the front-wheel drive clutch 70, the input torque Tin inputted to the front-wheel drive clutch 70 and the fluid temperature THoil2 of the oil or fluid in the front-wheel drive clutch 70. However, for example, the first state determination portion 142 may be configured to determine whether the heat load Q of the front-wheel drive clutch 70 is larger than the threshold value Q1 or not, depending on whether the fluid temperature THoil2 of the fluid in the front-wheel drive clutch 70 is higher than a predetermined temperature value or not, so that the electronic control apparatus 130 can limit the regenerative torque Tmdem of the second rotating machine MG2, depending on the fluid temperature THoil2 of the fluid in the front-wheel drive clutch 70, during deceleration running of the vehicle 10. Further, for example, the first state determination portion 142 may be configured to determine whether the heat load Q of the front-wheel drive clutch 70 is larger than the threshold value Q1 or not, depending on whether the input torque Tin inputted to the front-wheel drive clutch 70 is larger than a predetermined torque value or not, so that the electronic control apparatus 130 can limit the regenerative torque Tmdem of the second rotating machine MG2, depending on an amount of the input torque Tin inputted to the front-wheel drive clutch 70, during deceleration running of the vehicle 10.

In the above-described embodiment, in the case in which the heat load Q of the front-wheel drive clutch 70 is larger than the threshold value Q1, when the state of charge SOC of the battery 24, which represents the amount of the electric power stored or remaining in the battery 24, is larger than the predetermined value SOC1, the rear-wheel-side drive-power distribution ratio Xr is changed to 1.0, for example, for reducing the heat load Q of the front-wheel drive clutch 70. However, the rear-wheel-side drive-power distribution ratio Xr does not have to be changed necessarily to 1.0, namely, does not have to be changed necessarily until the front-wheel drive clutch 70 is released. That is, the heat load Q of the front-wheel drive clutch 70 can be reduced, also by only making the rear-wheel-side drive-power distribution ratio Xr larger than a value of the rear-wheel-side drive-power distribution ratio Xr upon determination that the heat load Q of the front-wheel drive clutch 70 is larger than the threshold value Q1.

In the above-described embodiment, the four-wheel drive vehicle 10 is a four-wheel drive vehicle based on a vehicle of FR (front engine and rear drive) system, and is a part-time four-wheel drive vehicle in which the two-wheel drive state and the four-wheel drive state are switchable to each other depending on the running state. Further, the four-wheel drive vehicle 10 in the above-described embodiment is a hybrid vehicle having the drive power sources in the form of the engine 12 and the first and second rotating machines MG1, MG2, and is a four-wheel drive vehicle provided with the automatic transmission 28 including the continuously-variable transmission portion 44 and the step-variable transmission portion 46 that are arranged in series. However, this arrangement is not essential. The present invention is applicable also to a four-wheel drive vehicle based on a vehicle of FF (front engine and front drive) system, a full-time four-wheel drive vehicle, or an electric vehicle provided with a single drive power source in the form of a rotating machine. Further, the present invention is applicable also to a four-wheel drive vehicle provided with an automatic transmission in the form of a known planetary-gear type automatic transmission, a known synchronous-meshing parallel-two-shaft-type transmission including DCT (dual clutch transmission), a known belt-type continuously variable transmission or an electrically-operated continuously variable transmission. Further, in the above-described electric vehicle provided with the single drive power source in the form of the rotating machine, an automatic transmission may not be provided in the vehicle, for example. It is noted that, in case of the four-wheel drive vehicle based on the vehicle of FF system, the front wheels serve as the main drive wheels while the rear wheels serve as the auxiliary drive wheels so that the front-wheel-side drive-power distribution ratio Xf is a ratio of the drive power transmitted to the main drive wheels. In case of the full-time four-wheel drive vehicle provided with a center differential gear device including a differential limiting clutch, for example, the drive-power distribution ratio Rx (that is the ratio of distribution of the drive power between the front wheels 14 and the rear wheels 16) is 50:50 when the differential limiting clutch is operated to limit or inhibit a differential motion of the center differential gear device, and the drive-power distribution ratio Rx is a predetermined ratio such as 30:70 when the differential limiting clutch is not operated. That is, the present invention is applicable to any four-wheel drive vehicle including: a rotating machine as a drive power source; a drive-power distribution clutch configured to allocate a part of a drive power outputted to main drive wheels from the drive power source, to auxiliary drive wheels, so as to distribute the drive power to the main drive wheels and the auxiliary drive wheels with a drive-power distribution ratio that is a ratio of distribution of the drive power between the auxiliary drive wheels and the main drive wheels, such that the drive-power distribution ratio is variable with an engaging force of the drive-power distribution clutch being controlled; and a control apparatus.

In the above-described embodiment, the front-wheel drive clutch 70 of the transfer 30 is constructed such that, when the electric motor 86 is rotated, the piston 84 is moved through the cam mechanism 90 in a direction toward the frictional engagement elements 82, so as to press the frictional engagement elements 82. However, this construction is not essential. For example, the front-wheel drive clutch 70 may include a ball screw configured to covert a rotation motion into a linear motion, such that the piston 84 is moved, upon rotation of the electric motor 86, through the ball screw, in the direction toward the frictional engagement elements 82, so as to press the frictional engagement elements 82. Further, the front-wheel drive clutch 70 may include a hydraulic actuator by which the piston 84 is to be moved in the direction toward the frictional engagement elements 82.

It is to be understood that the embodiment described above is given for illustrative purpose only, and that the present invention may be embodied with various modifications and improvements which may occur to those skilled in the art.

NOMENCLATURE OF ELEMENTS

10: four-wheel drive vehicle
14: (14R, 14L): front wheels (auxiliary drive wheels)
16: (16R, 16L): rear wheels (main drive wheels)
24: battery (electric storage device)
70: front-wheel drive clutch (drive-power distribution clutch)
101: wheel brake
102: shift operation device (deceleration adjustment device)
130: electronic control apparatus (control apparatus)
134: hybrid control portion
136: four-wheel-drive control portion
138: deceleration-running determination portion
140: braking-force control portion
142: first state determination portion
142a: threshold-value change portion
142b: deceleration-request determination portion
144: second state determination portion
MG2: second rotating machine (drive power source, rotating machine)
PU: drive power source
Q: heat load
Qr: limitation-cancellation value
Q1: threshold value
Rx: drive-power distribution ratio
SOC: state of charge
SOC1: predetermined value
THoil2: fluid temperature
Tin: input torque
Tmdem: regenerative torque

What is claimed is:

1. A four-wheel drive vehicle comprising:
   main drive wheels and auxiliary drive wheels;
   a rotating machine as a drive power source;
   a drive-power distribution clutch configured to allocate a part of a drive power outputted to the main drive wheels from the drive power source, to the auxiliary drive wheels, so as to distribute the drive power to the main drive wheels and the auxiliary drive wheels with a drive-power distribution ratio that is a ratio of distribution of the drive power between the auxiliary drive wheels and the main drive wheels, such that the drive-power distribution ratio is variable with an engaging force of the drive-power distribution clutch being controlled; and
   a control apparatus configured, during deceleration running of the vehicle, to determine whether a heat load of the drive-power distribution clutch is large or not, and to limit a regenerative torque of the rotating machine when determining that the heat load is large, as compared with when determining that the heat load is small.

2. The four-wheel drive vehicle according to claim 1,
   wherein each of the main and auxiliary drive wheels is provided with a wheel brake that is configured to apply a braking force to the each of the main and auxiliary drive wheels, and
   wherein the control apparatus is configured, when limiting the regenerative torque of the rotating machine, to control the braking force applied by the wheel brake to each of the main and auxiliary drive wheels, so as to compensate a shortage of a total braking force acting on the vehicle, the shortage being due to limitation of the regenerative torque of the rotating machine.

3. The four-wheel drive vehicle according to claim 2,
   wherein the control apparatus is configured, when compensating the shortage of the total braking force acting on the vehicle, to control the braking force applied by the wheel brake to each of the main and auxiliary drive wheels, such that a ratio between a part of the total braking force applied to each of the main drive wheels and a part of the total braking force applied to each of the auxiliary drive wheels becomes substantially equal to the drive-power distribution ratio.

4. The four-wheel drive vehicle according to claim 1, further comprising an electric storage device to and from which an electric power is to be supplied from and to the rotating machine,
   wherein the control apparatus is configured, when the heat load of the drive-power distribution clutch is to be reduced upon determination that the heat load is large during the deceleration running of the vehicle, to limit the regenerative torque of the rotating machine in a case in which a state of charge that is an amount of the electric power remaining in the electric storage device is not smaller than a predetermined value, and to change the drive-power distribution ratio such that the heat load of the drive-power distribution clutch is reduced in a case in which the state of charge is smaller than the predetermined value.

5. The four-wheel drive vehicle according to claim 1,
   wherein the control apparatus is configured to determine whether the heat load of the drive-power distribution clutch is large or not, based on an amount of an input torque inputted to the drive-power distribution clutch.

6. The four-wheel drive vehicle according to claim 1,
wherein the drive-power distribution clutch is a wet clutch, and
wherein the control apparatus is configured to determine whether the heat load of the drive-power distribution clutch is large or not, based on a temperature of an oil in the drive-power distribution clutch.

7. The four-wheel drive vehicle according to claim 1,
wherein the control apparatus is configured, during the deceleration running of the vehicle, to determine that the heat load of the drive-power distribution clutch is large when the heat load of the drive-power distribution clutch is larger than a threshold value, and to determine that the heat load of the drive-power distribution clutch is small when the heat load of the drive-power distribution clutch is not larger than the threshold value.

8. The four-wheel drive vehicle according to claim 7,
wherein the control apparatus is configured, when the heat load of the drive-power distribution clutch has become larger than the threshold value, to limit the regenerative torque of the rotating machine, and to set a limitation-cancellation value that is smaller than the threshold value, and
wherein the control apparatus is configured, when the heat load of the drive-power distribution clutch has become not larger than the limitation-cancellation value, to cancel limitation of the regenerative torque of the rotating machine.

9. The four-wheel drive vehicle according to claim 7,
further comprising a deceleration adjustment device that is to be manually operated by a driver of the vehicle during the deceleration running of the vehicle, so as to adjust a degree of deceleration of the vehicle,
wherein the control apparatus is configured, when the deceleration adjustment device is manually operated by the driver of the vehicle, to change the threshold value such that the threshold value is increased.

10. The four-wheel drive vehicle according to claim 7,
wherein the control apparatus is configured, when the heat load of the drive-power distribution clutch is larger than the threshold value, to reduce the regenerative torque of the rotating machine at a reduction ratio that is constant irrespective of a difference between the heat load of the drive-power distribution clutch and the threshold value.

11. The four-wheel drive vehicle according to claim 7,
wherein the control apparatus is configured, when the heat load of the drive-power distribution clutch is larger than the threshold value, to reduce the regenerative torque of the rotating machine at a reduction ratio that is increased with increase of a difference between the heat load of the drive-power distribution clutch and the threshold value.

* * * * *